(12) United States Patent
Tamaki et al.

(10) Patent No.: US 9,323,121 B2
(45) Date of Patent: Apr. 26, 2016

(54) SEMI-TRANSMISSIVE DISPLAY APPARATUS, METHOD FOR DRIVING SEMI-TRANSMISSIVE DISPLAY APPARATUS, AND ELECTRONIC SYSTEM

(75) Inventors: Masaya Tamaki, Kanagawa (JP); Kazuyuki Maeda, Aichi (JP)

(73) Assignee: JAPAN DISPLAY INC., Tokyo (JP)

( * ) Notice: Subject to any disclaimer, the term of this patent is extended or adjusted under 35 U.S.C. 154(b) by 176 days.

(21) Appl. No.: 13/487,162

(22) Filed: Jun. 2, 2012

(65) Prior Publication Data

US 2012/0313906 A1 Dec. 13, 2012

(30) Foreign Application Priority Data

Jun. 9, 2011 (JP) .................................. 2011-128854

(51) Int. Cl.
*G02F 1/29* (2006.01)
*G02F 1/1362* (2006.01)
*G02F 1/1335* (2006.01)
*G09G 3/20* (2006.01)
*G09G 3/36* (2006.01)

(52) U.S. Cl.
CPC .... *G02F 1/136286* (2013.01); *G02F 1/133555* (2013.01); *G09G 3/3648* (2013.01); *G09G 3/2077* (2013.01); *G09G 3/3614* (2013.01); *G09G 2300/0426* (2013.01); *G09G 2300/0456* (2013.01)

(58) Field of Classification Search
CPC ..... G09G 3/36; G09G 3/2077; G09G 3/3614; G09G 3/3648; G09G 2300/0426; G09G 2300/0456; G02F 1/1335; G02F 1/1343; G02F 1/136286; G02F 1/133555

USPC .......... 345/38, 87, 92, 113; 349/64, 114, 117, 349/139, 141, 187
See application file for complete search history.

(56) References Cited

U.S. PATENT DOCUMENTS

| 2003/0128317 | A1* | 7/2003 | Ohmuro et al. ............... 349/113 |
| 2004/0090410 | A1 | 5/2004 | Ohmuro |
| 2005/0140893 | A1* | 6/2005 | Hong ............................ 349/139 |
| 2005/0270433 | A1* | 12/2005 | Ohue et al. ..................... 349/38 |
| 2008/0018839 | A1 | 1/2008 | Kuo |
| 2011/0090140 | A1* | 4/2011 | Kim ................................ 345/87 |

FOREIGN PATENT DOCUMENTS

| JP | 08-050288 | 2/1996 |
| JP | 2004-177875 | 6/2004 |
| JP | 2005-257836 | 9/2005 |

(Continued)

OTHER PUBLICATIONS

Japanese Office Action issued in connection with related Japanese patent application No. 2011128854 dated Apr. 1, 2014.

(Continued)

*Primary Examiner* — Lun-Yi Lao
*Assistant Examiner* — Johny Lau
(74) *Attorney, Agent, or Firm* — Dentons US LLP

(57) ABSTRACT

A semi-transmissive display apparatus includes: a reflective electrode provided for each pixel, wherein the semi-transmissive display apparatus performs reflective display operation by using the reflective electrodes and transmissive display operation by using spaces between the reflective electrodes of the pixels.

15 Claims, 20 Drawing Sheets

(56) References Cited

FOREIGN PATENT DOCUMENTS

| | | |
|---|---|---|
| JP | 2005-300579 | 10/2005 |
| JP | 2009-093115 | 4/2009 |

OTHER PUBLICATIONS

Chinese Office Action dated Sep. 6, 2015 corresponding to Chinese Serial No. 20120177203.9.

* cited by examiner

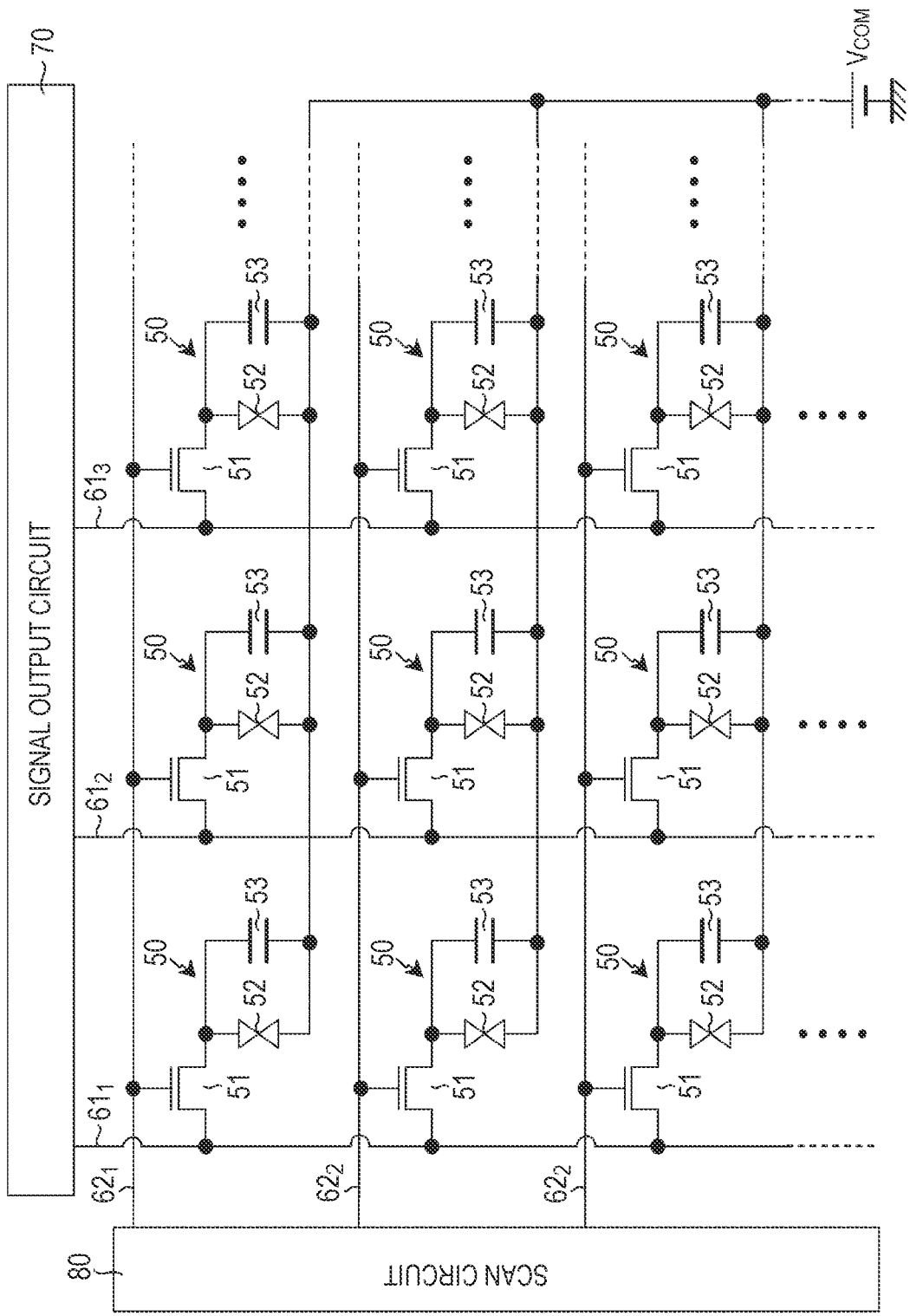

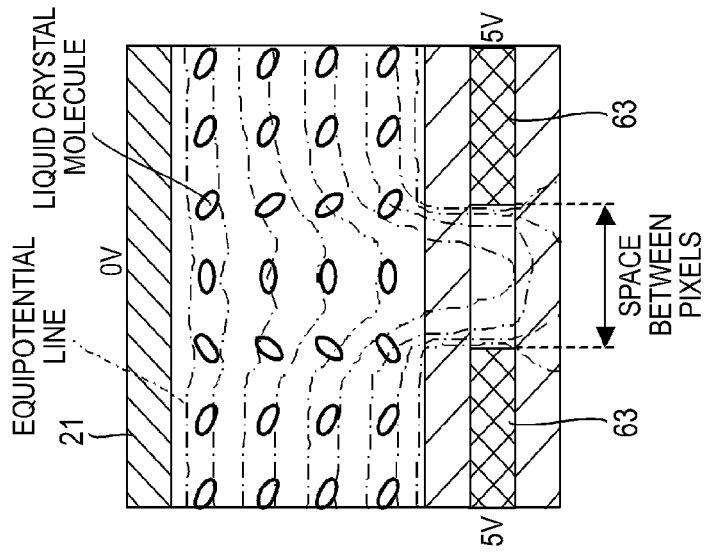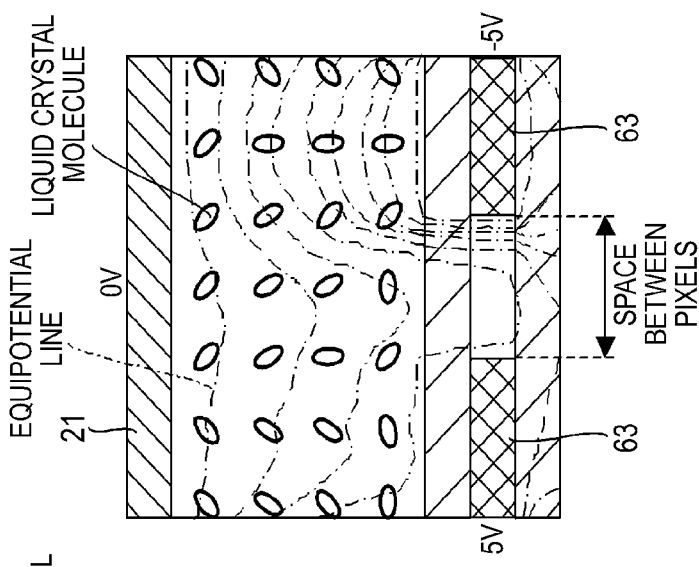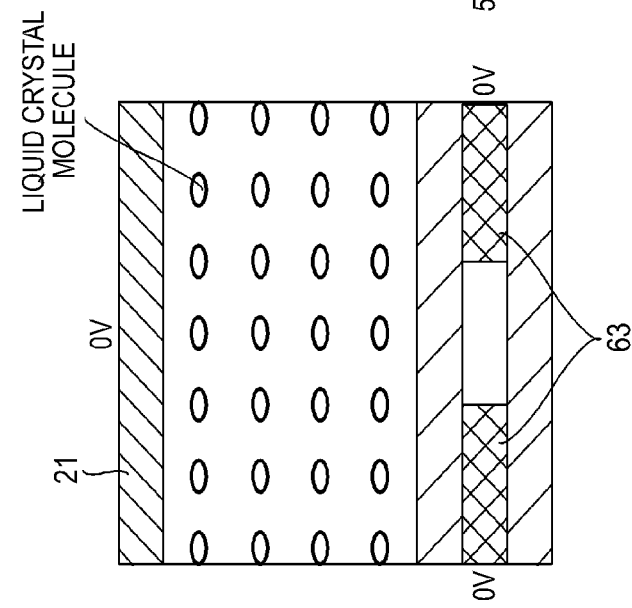

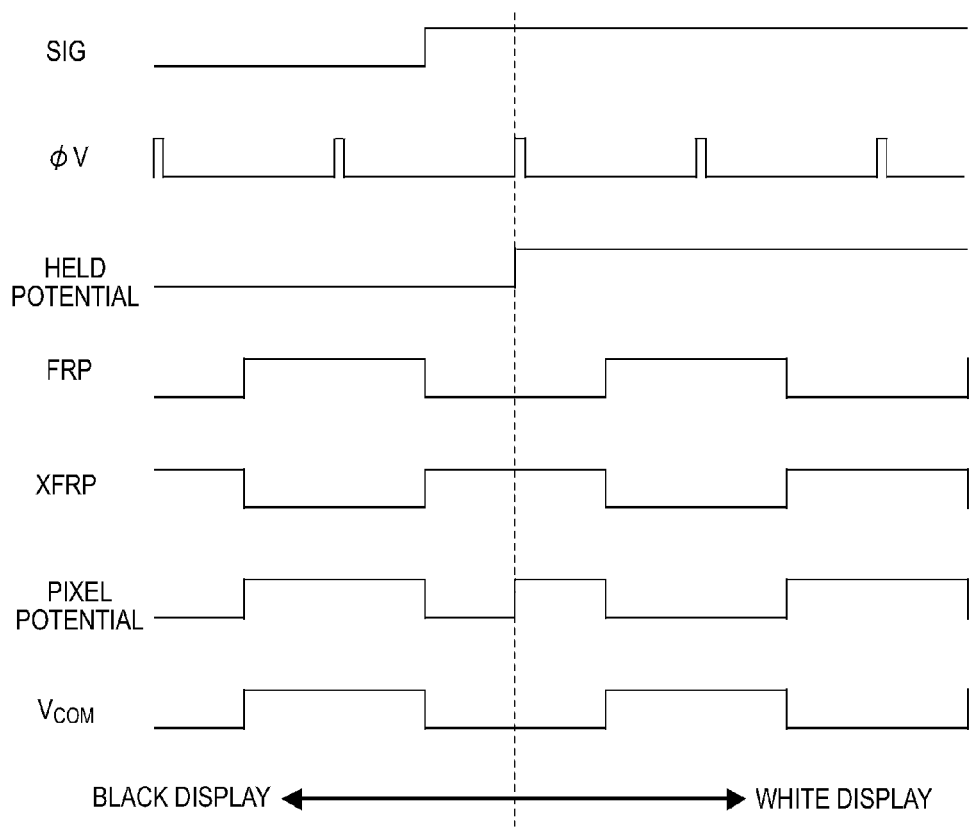

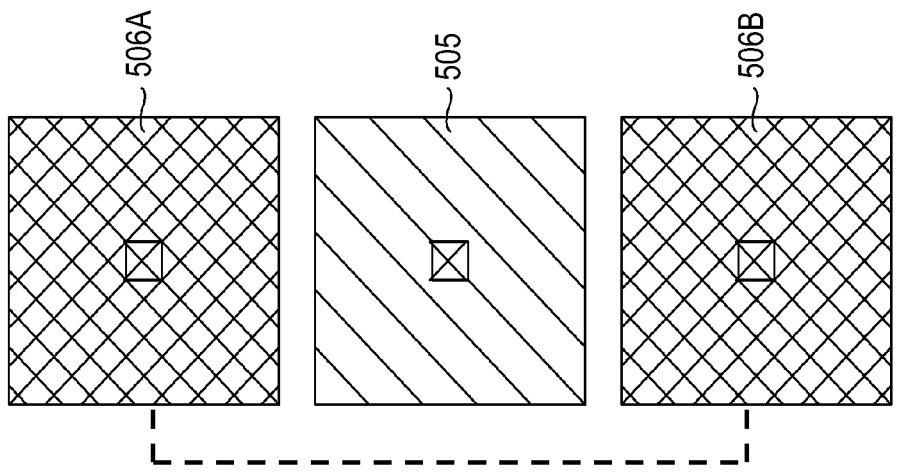
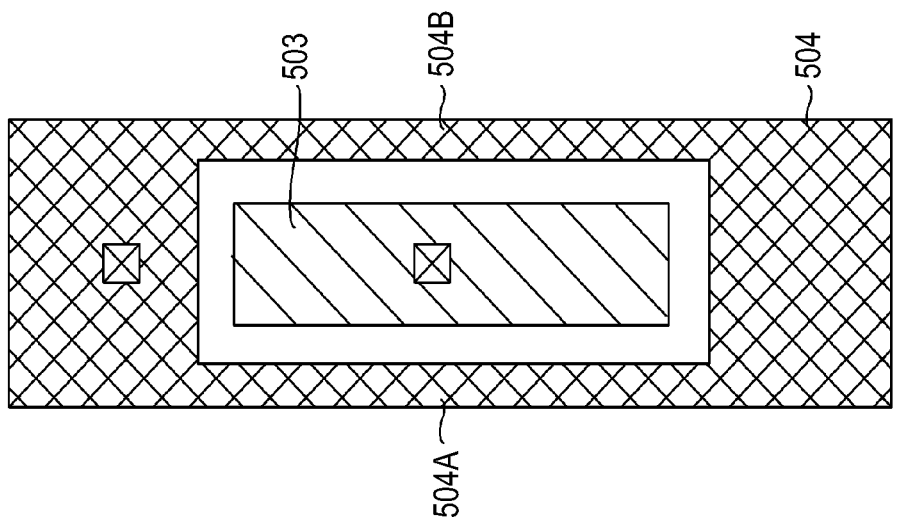
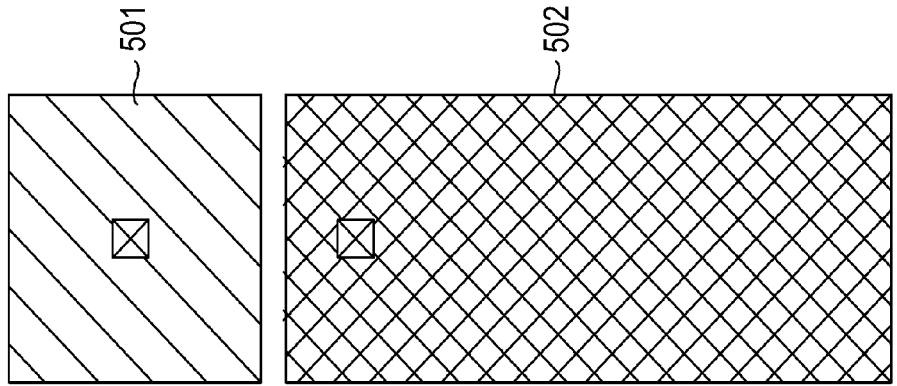

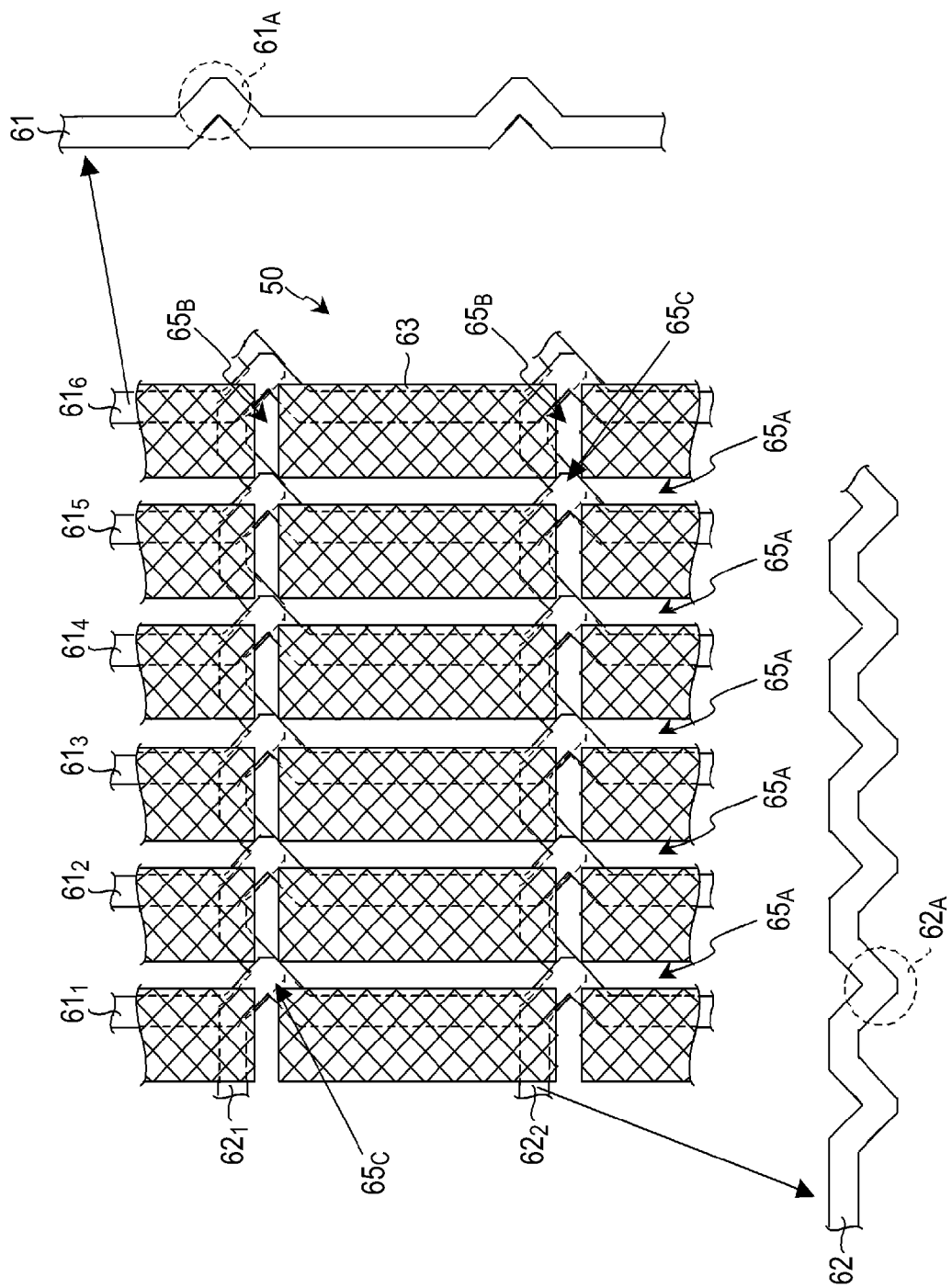

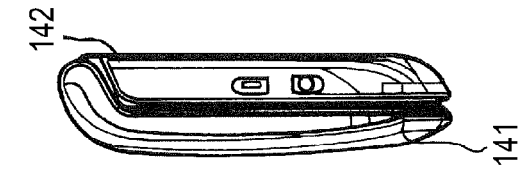
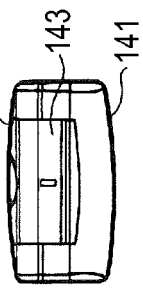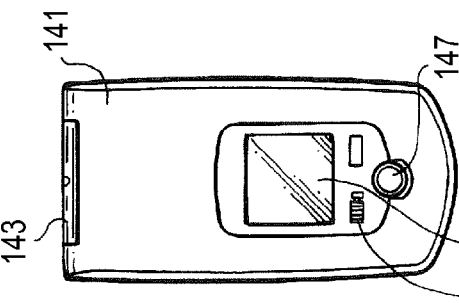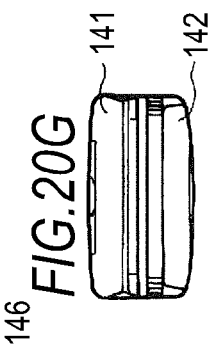
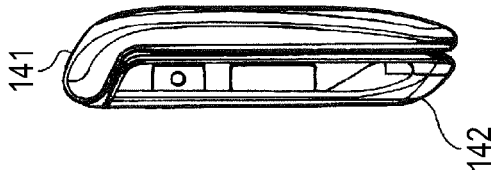
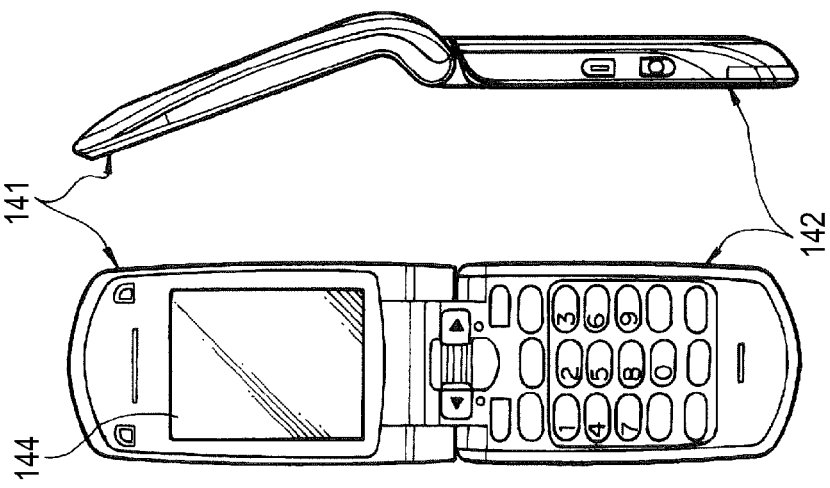

SEMI-TRANSMISSIVE DISPLAY APPARATUS, METHOD FOR DRIVING SEMI-TRANSMISSIVE DISPLAY APPARATUS, AND ELECTRONIC SYSTEM

FIELD

The present disclosure relates to a semi-transmissive display apparatus, a method for driving the same (semi-transmissive display apparatus), and an electronic system.

BACKGROUND

Display apparatus are generally classified into transmissive display apparatus that perform display operation by using light emitted from a backlight and transmitted through the backside of a screen and reflective display apparatus that perform display operation by using reflected external light. A transmissive display apparatus is characterized by high chroma and high visibility of a screen even in a dark environment, whereas a reflective display apparatus is characterized by low power consumption and high visibility of a screen even in a bright environment.

Further, there is a display apparatus having both the characteristics of a transmissive display apparatus and a reflective display apparatus, for example, a semi-transmissive display apparatus having transmissive display regions (transmissive display sections) and reflective display regions (reflective display sections) in a single pixel (see JP-A-2009-93115, for example). A semi-transmissive display apparatus performs display operation by using transmitted light from a backlight in a dark environment whereas performing display operation by using reflected external light in a bright environment.

A semi-transmissive display apparatus, which is characterized by high visibility of a screen both in bright and dark environments and low power consumption, is used as a display section of an electronic system, particularly, a mobile electronic system frequently used in outdoor settings (mobile terminal device), for example, digital cameras and other mobile information devices and mobile phones and other mobile communication devices.

SUMMARY

In a semi-transmissive display apparatus, providing transmissive display regions and maintaining reflective display performance are difficult to achieve at the same time. That is, increasing the areas of the transmissive display regions to improve transmissive display performance inevitably narrows the areas of the reflective display regions accordingly, resulting in decrease in reflective display performance. Conversely, maintaining the reflective display performance to be comparable to that of a reflective display apparatus typically requires increasing the areas of the reflective display regions, resulting in decrease in transmissive display performance accordingly.

It is therefore desirable to provide a semi-transmissive display apparatus capable of performing transmissive display operation while maintaining reflective display performance comparable to that of a reflective display apparatus, a method for driving the semi-transmissive display apparatus, and an electronic system including the semi-transmissive display apparatus.

An embodiment of the present disclosure is directed to a semi-transmissive display apparatus including a reflective electrode provided for each pixel. The semi-transmissive display apparatus performs reflective display operation by using the reflective electrodes and transmissive display operation by using spaces between the reflective electrodes of the pixels. The semi-transmissive display apparatus is preferably used as a display section of a variety of electronic systems, particularly, a mobile electronic system frequently used in outdoor settings.

In the thus configured semi-transmissive display apparatus or an electronic system using the display apparatus, performing transmissive display operation by using the spaces between the reflective electrodes of the pixels means that the spaces between the pixels are used as transmissive display regions. It is therefore not necessary to provide a region dedicated to the transmissive display operation in each of the pixels, which means that the size (area) of the reflective electrode in each of the pixels can be comparable to that of a reflective electrode in a reflective display apparatus. The transmissive display operation can therefore be performed through the spaces between the reflective electrodes of the pixels with reflective display performance comparable to that of a reflective display apparatus.

According to the embodiment of the present disclosure, transmissive display operation can be performed by using spaces between reflective electrodes of pixels while maintaining reflective display performance comparable to that of a reflective display apparatus.

BRIEF DESCRIPTION OF THE DRAWINGS

FIG. 2 is a circuit diagram showing a basic pixel circuit;

FIGS. 5A to 5C show simulation results that describe a reason why a frame inversion driving method is preferably employed, FIG. 5A showing a case where no voltage is applied, FIG. 5B showing a case where a voltage is applied in a line or dot inversion driving method, and FIG. 5C showing a case where a voltage is applied in the frame inversion driving method;

FIG. 7 is a timing chart for describing the operation of the MIP pixel;

FIGS. 8A to 8C describe pixel division in an area-based grayscale method;

FIG. 16 is a plan view showing an electrode structure in a pixel section according to a variation;

FIGS. 20A to 20G show the exterior appearance of a mobile phone to which the present disclosure is applied, FIG. 20A being a front view of the mobile phone in an open state, FIG. 20B being a side view of the mobile phone in the open state, FIG. 20C being a front view of the mobile phone in a closed state, FIG. 20D being a left side view of the mobile phone in the closed state, FIG. 20E being a right side view of the mobile phone in the closed state, FIG. 20F being a top view of the mobile phone in the closed state, and FIG. 20G being a bottom view of the mobile phone in the closed state.

DETAILED DESCRIPTION

Figure 1:
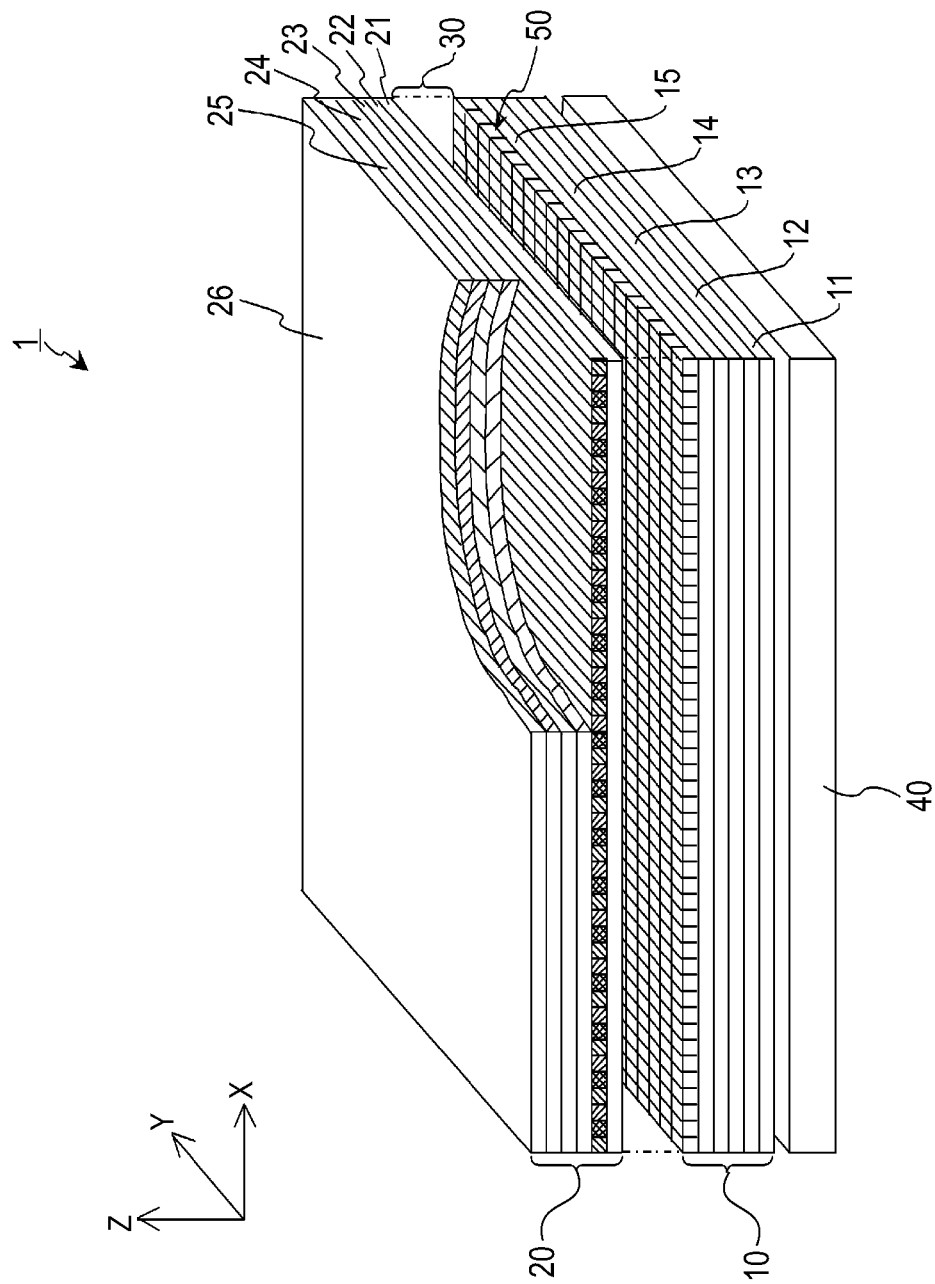
FIG. 1 is a perspective view showing a schematic configuration of a semi-transmissive liquid crystal display apparatus to which the present disclosure is applied with part of the display apparatus cut away.

Embodiments of the technology of the present disclosure (hereinafter referred to as "embodiment") will be described below in detail with reference to the drawings. The description will be made in the following order.

1. Semi-transmissive display apparatus to which present disclosure is applied
1-1. Semi-transmissive liquid crystal display apparatus that supports color display
1-2. Basic pixel circuit
1-3. Considerations on electrode structure in pixel section
2. Description of embodiment
2-1. Method for driving liquid crystal display panel
2-2. MIP method
2-3. Area-based grayscale method
2-4. Display mode
2-5. Specific examples
3. Variation
4. Electronic systems
5. Configuration of present disclosure

1. Semi-Transmissive Display Apparatus to which Present Disclosure is Applied The technology of the present disclosure is applicable to a flat-panel (planar) display apparatus. Examples of the flat-panel display apparatus may include a display apparatus using a liquid crystal display (LCD) panel, a display apparatus using an electroluminescence (EL) display panel, and a display apparatus using a plasma display (PD) panel.

The flat-panel display apparatus can be classified in terms of display mode into a transmissive type, a reflective type, and a semi-transmissive type. The technology of the present disclosure is applicable to a semi-transmissive display apparatus having the characteristics of both a transmissive display apparatus and a reflective display apparatus, that is, a semi-transmissive display apparatus characterized by high visibility of a screen both in bright and dark environments and low power consumption. A semi-transmissive display apparatus having the characteristics described above is preferably used as a display section of an electronic system, particularly, a mobile electronic system frequently used in outdoor settings, that is, mobile terminal devices, for example, digital cameras and other mobile information devices and mobile phones and other mobile communication apparatus.

A semi-transmissive display apparatus to which the present disclosure is applied may be a display apparatus that supports monochromatic display or a display apparatus that supports color display. In a display apparatus that supports color display, a single pixel (unit pixel), which is a unit that forms a color image, is formed of a plurality of sub-pixels. More specifically, in a display apparatus that supports color display, a single pixel is formed, for example, of the following three sub-pixels: a sub-pixel that displays red (R), a sub-pixel that displays green (G), and a sub-pixel that displays blue (B).

It is, however, noted that a single pixel is not limited to the combination of sub-pixels that display three RGB primary colors but can be the combination of not only sub-pixels that display three RGB primary colors but also an extra sub-pixel that displays another color or extra sub-pixels that display other colors. More specifically, for example, a single pixel can be formed by adding an extra sub-pixel that displays white (W) to improve luminance or by adding at least one extra sub-pixel that displays a complementary color to expand a color reproducing range.

1-1. Semi-Transmissive Liquid Crystal Display Apparatus that Supports Color Display A semi-transmissive display apparatus to which the present disclosure is applied will be described below with reference to a semi-transmissive liquid crystal display apparatus that supports color display.

FIG. 1 is a perspective view showing a schematic configuration of a semi-transmissive liquid crystal display apparatus that supports color display to which the present disclosure is applied with part of the display apparatus cut away.

A semi-transmissive display apparatus 1 to which the present disclosure is applied includes the following primary components: a first panel section 10, a second panel section 20, a liquid crystal layer 30, and a backlight section 40, and the front side of the second panel section 20 is a display surface, as shown in FIG. 1. The first panel section 10 and the second panel section 20 face each other with a predetermined gap therebetween. A liquid crystal material is sealed in the gap between the first panel section 10 and the second panel section 20 to form the liquid crystal layer 30.

The first panel section 10 has a polarizer 11, a half-wave plate 12, a quarter-wave plate 13, a first substrate 14 made of transparent glass or any other suitable substrate material, and a planarization film 15 provided in this order from the side facing away from the liquid crystal layer 30, that is, the side where the backlight section 40 is present.

In the first panel section 10, a plurality of signal lines (not shown) and a plurality of scan lines (not shown) are so formed on the first substrate 14 that the signal lines and the scan line intersect each other. Sub-pixels (hereinafter also simply referred to as "pixels" in some cases) 50 are two-dimensionally arranged in rows and columns at the intersections of the plurality of signal lines and the plurality of scan lines.

Circuit devices, such as a TFT (thin film transistor) or any other suitable switching device and a capacitance device, are also formed on the first substrate 14 for each of the pixels 50. The surface of the first panel section 10 on which the circuit devices, the signal lines, and the scan lines are formed is planarized by forming the planarization film 15 over the surface. A reflective electrode that will be described later is then formed on the planarization film 15 for each of the pixels 50. The first substrate 14, on which the circuit devices including TFTs are formed, is called a TFT substrate in some cases.

The plurality of signal lines are wiring lines that transmit signals for driving the pixels 50 (display signals/video signals) and have a wiring structure in which the signal lines extend on a pixel column basis with respect to the row and column arrangement of the pixels 50 along the direction in which the pixels in the pixel columns are arranged, that is, in a column direction (Y direction in FIG. 1). The plurality of scan lines are wiring lines that transmit signals for selecting pixels 50 on a row basis (scan signals) and have a wiring structure in which the scan lines extend on a pixel row basis with respect to the row and column arrangement of the pixels 50 along the direction in which the pixels in the pixel rows are arranged, that is, in a row direction (X direction in FIG. 1).

The second panel section 20 has a transparent electrode 21 made, for example, of ITO (indium tin oxide), a color filter 22, a second substrate 23 made of transparent glass or any other suitable substrate material, a quarter-wave plate 24, a half-wave plate 25, and a polarizer 26 provided in this order from the side where the liquid crystal layer 30 is present.

In the second panel section 20, the color filter 22 has, for example, stripe-shaped R (red), G (green), and B (blue) filters, which extend in the column direction (Y direction), repeatedly arranged at the same intervals as the intervals at which the pixels 50 are arranged in the row direction (X direction). The second substrate 23, on which the color filter (CF) 22 is formed, is called a CF substrate in some cases.

The first panel section 10, the second panel section 20, which faces the first panel section 10, and the liquid crystal layer 30, which is disposed between the first panel section 10 and the second panel section 20, described above form a semi-transmissive liquid crystal display panel, and the upper surface (front surface) of the second panel section 20 forms a display surface.

The backlight section 40 is an illuminator that illuminates the liquid crystal display panel from the backside thereof, that is, the side of the first panel section 10 that faces away from the liquid crystal layer 30. The backlight section 40 is not necessarily configured in a specific manner but can be formed, for example, of an LED (light emitting diode), a fluorescent tube, or any other suitable light source, a prism sheet, a diffuser sheet, a light guide plate, and other known members.

In the thus configured semi-transmissive display apparatus 1, each of the pixels 50 has a reflective display region (reflective display section) and a transmissive display region (transmissive display section). The reflective display region, which is formed of a reflective electrode formed on the planarization film 15 for each of the pixels 50 as described above, reflects external light externally incident through the second panel section 20 and performs display operation based on the reflected light. The transmissive display region transmits the light from the backlight section 40 and performs display operation based on the transmitted light. The transmissive display region provided for each of the pixels 50 is a characteristic portion of the present disclosure and will be described later in detail.

1-2. Basic Pixel Circuit

A basic pixel circuit of each of the pixels 50 will now be described with reference to FIG. 2.

A plurality of signal lines 61 ($61_1$, $61_2$, $61_3$, ...) and a plurality of scan lines 62 ($62_1$, $62_2$, $62_3$, ...) are so wired that they intersect each other, and the pixels 50 are disposed at the intersections, as shown in FIG. 2. The plurality of signal lines 61 and the plurality of scan lines 62 are formed on the first substrate (TFT substrate) 14 of the first panel section 10, as described above. Ends of the signal lines 61 ($61_1$, $61_2$, $61_3$, ...) are connected to output ends corresponding to respective columns of a signal output circuit 70, and ends of the scan lines 62 ($62_1$, $62_2$, $62_3$, ...) are connected to output ends corresponding to respective rows of a scan circuit 80.

Each of the pixels 50 includes, for example, a pixel transistor 51 formed of a thin film transistor (TFT), liquid crystal capacitance 52, and retention capacitance 53. The pixel transistor 51 has a gate electrode connected to the corresponding one of the scan lines 62 ($62_1$, $62_2$, $62_3$, ...) and a source electrode connected to the corresponding one of the signal lines 61 ($61_1$, $61_2$, $61_3$, ...).

The liquid crystal capacitance 52 means a capacitance component of the liquid crystal material that is produced between a pixel electrode (corresponding to reflective electrode formed for each pixel) and a counter electrode (corresponding to transparent electrode 21 in FIG. 1) so formed that it faces the pixel electrode, and the pixel electrode is connected to a drain electrode of the pixel transistor 51. A common potential $V_{COM}$ of a DC voltage is applied to the counter electrode of the liquid crystal capacitance 52. The same common potential $V_{COM}$ is applied to all the pixels. The retention capacitance 53 has one electrode connected to the pixel electrode of the liquid crystal capacitance 52 and the other electrode connected to the counter electrode of the liquid crystal capacitance 52.

The plurality of signal lines 61 ($61_1$, $61_2$, $61_3$, ...) are wiring lines that transmit signals for driving the pixels 50, that is, video signals outputted from the signal output circuit 70, to the pixels 50 on a pixel column basis, as clearly shown in the pixel circuit described above. The plurality of scan lines 62 ($62_1$, $62_2$, $62_3$, ...) are wiring lines that transmit signals for selecting the pixels 50 on a row basis, that is, scan signals outputted from the scan circuit 80, on a pixel row basis.

1-3. Considerations on Electrode Structure in Pixel Section

The electrode structure of each of the pixels 50 will be considered before the transmissive display regions, which are a characteristic portion of the present disclosure, is described.

Figure 3A:
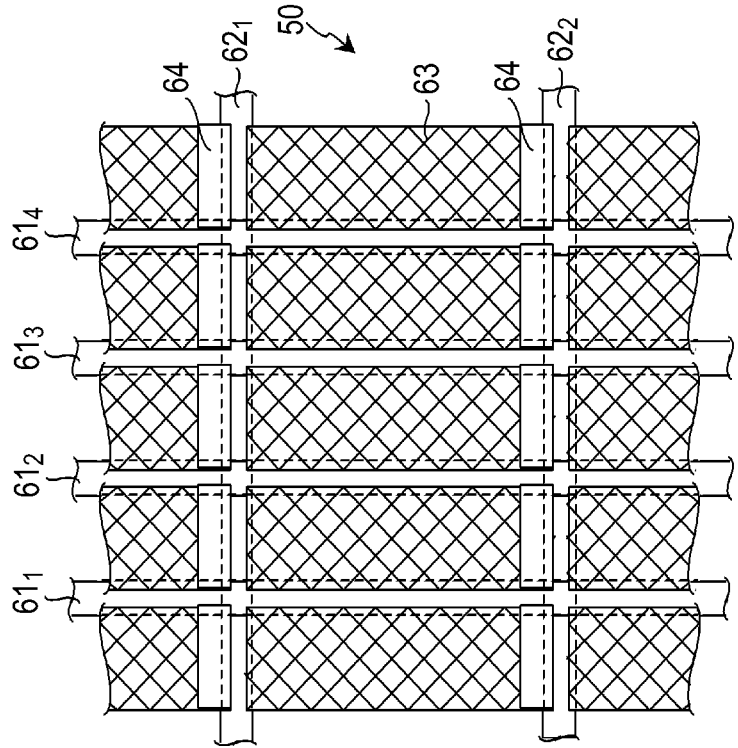
FIGS. 3A and 3B describe electrode structures in pixel sections of related art, FIG. 3A being a plan view of a pixel section in a reflective liquid crystal display apparatus of related art and FIG. 3B being a plan view of a pixel section in a semi-transmissive liquid crystal display apparatus of related art.
Figure 3B:
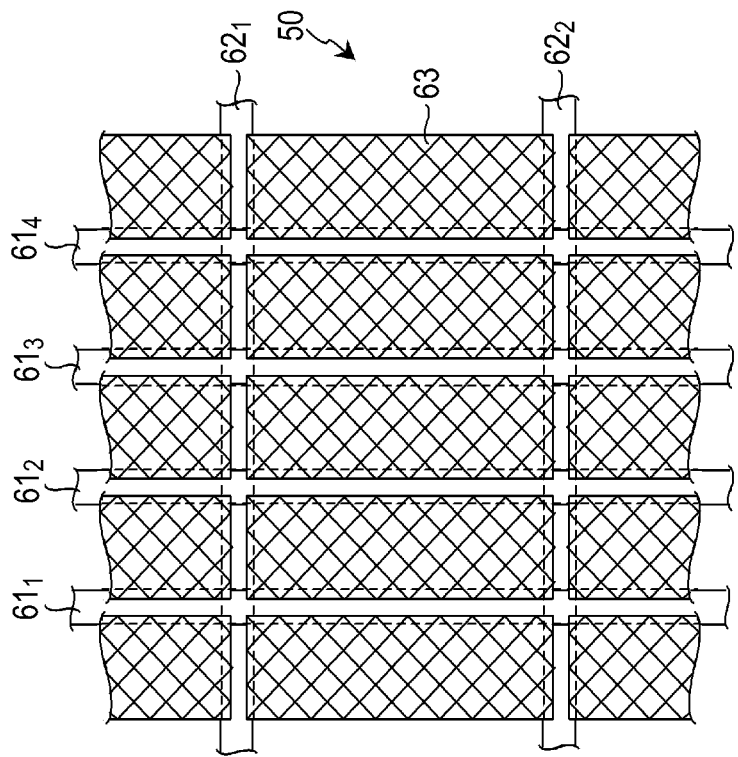

FIGS. 3A and 3B describe electrode structures in pixel sections of related art. FIG. 3A is a plan view of a pixel section in a reflective (totally reflective) liquid crystal display apparatus, and FIG. 3B is a plan view of a pixel section in a semi-transmissive liquid crystal display apparatus of related art. In FIGS. 3A and 3B, reflective electrodes 63 are hatched.

As shown in FIGS. 3A and 3B, each of the pixel sections in the liquid crystal display apparatus is so configured that the pixels 50 are arranged in rows and columns and the signal lines 61 and scan lines are wired with respect to the row and column arrangement, specifically, the signal lines 61 are disposed in the spaces between the pixels extending along the column direction and the scan lines 62 are disposed in the spaces between the pixels extending along the row direction. The signal lines 61 and the scan lines 62 are so wired on the first substrate 14 of the first panel section 10 that the signal lines and the scan lines intersect each other, as described above with reference to FIG. 1.

In the reflective liquid crystal display apparatus shown in FIG. 3A having the thus configured pixel section (pixel array section), the reflective electrodes 63 made of aluminum or any other suitable metal are so formed that the size thereof is substantially the same as that of the pixels 50, and the regions of the reflective electrodes 63 are used as reflective display regions. That is, in the reflective liquid crystal display apparatus, desired reflective display performance is achieved by providing reflective display regions having a size substantially the same as the size of the pixels 50.

In contrast, in the semi-transmissive liquid crystal display apparatus of related art shown in FIG. 3B, a reflective electrode 63 and an opening 64 are formed in a single pixel 50, and the opening 64 is used as a transmissive display region. When the opening 64 is formed in each of the pixels 50 to provide the transmissive display region, the area of the reflective electrode 63, that is, the area of the reflective display region, is inevitably reduced by the area of the opening 64, resulting in lower reflective display performance than that of the reflective liquid crystal display apparatus. That is, providing a transmissive display region and maintaining the reflective display performance are difficult to achieve at the same time.

2. Description of Embodiment

The semi-transmissive liquid crystal display apparatus according to the embodiment of the present disclosure is characterized in that transmissive display operation is performed by using the spaces between the reflective electrodes 63 of the pixels 50 with the reflective display performance comparable to that of a reflective display apparatus. Specifically, in the pixel section having the pixels 50 arranged in rows and columns, the signal lines 61, the scan lines 62, and other wiring lines are so formed that they do not block the spaces between the reflective electrodes 63 of the pixels 50 as shown in FIG. 4, whereby the spaces can be used as the transmissive display regions for transmissive display operation.

Figure 4:
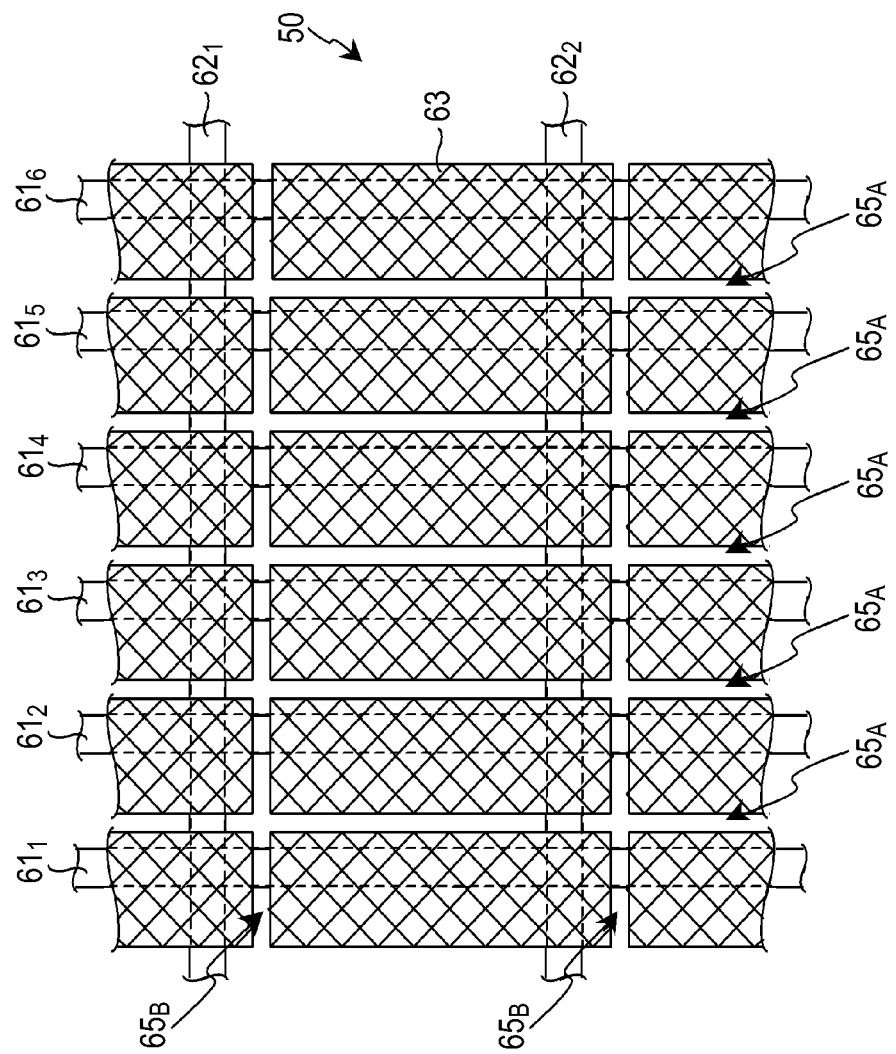
FIG. 4 is a plan view showing an electrode structure in a pixel section according to an embodiment.

In FIG. 4, the reflective electrodes 63 are hatched. The spaces between the reflective electrodes 63 of the pixels 50 include spaces $65_A$ extending along the direction in which the pixels in the pixel columns are arranged, that is, the column direction (vertical direction in FIG. 4), and spaces $65_B$ extending along the direction in which the pixels in the pixel rows are arranged, that is, the row direction (horizontal direction in FIG. 4). In the present embodiment, wiring lines formed in the pixel section are the signal lines 61 and the scan lines 62 by way of example but not limited thereto. That is, the wiring lines used herein include all drive lines (control lines) necessary to drive (control) the pixels 50.

The term "do not block spaces" used herein does not exclude a situation in which there is a region where the wiring lines overlap with the spaces $65_A$ and $65_B$ between the reflective electrodes 63 of the pixels 50. Specifically, the concept of "do not block spaces" includes a situation in which the signal lines 61 wired in the column direction overlap with the spaces $65_B$ extending in the row direction and a situation in which the scan lines 62 wired in the row direction overlap with the spaces $65_A$ extending in the column direction.

The concept of "do not block spaces" also includes a situation in which part of the signal lines 61 overlap with the spaces $65_A$ extending in the column direction or the signal lines 61 partially overlap with the spaces $65_A$ and a situation in which part of the scan lines 62 overlap with the spaces $65_B$ extending in the row direction or the scan lines 62 partially overlap with the spaces $65_B$. In any of the cases described above, regions where the signal lines 61 or the scan lines 62 do not overlap with the spaces $65_A$ or $65_B$ are used as the transmissive display regions.

To form wiring lines not to block the spaces $65_A$ or $65_B$ between the reflective electrodes 63 of the pixels 50, it is preferable to form the wiring lines in portions other than the spaces $65_A$ or $65_B$ between the reflective electrodes 63 of the pixels 50. The term "other than the spaces" stands for a state in which no wiring line is present in the spaces $65_A$ or $65_B$ between the reflective electrodes 63 of the pixels 50 (that is, there is no region where wiring lines overlap with the spaces $65_A$ or $65_B$).

Specifically, the signal lines 61 are preferably wired in positions other than the spaces $65_A$ extending in the column direction, that is, so wired that there is no region (portion) where the signal lines 61 overlap with the spaces $65_A$, as shown in FIG. 4. Similarly, the scan lines 62 are preferably wired in positions other than the spaces $65_B$ extending in the row direction, that is, so wired that there is no region where the scan lines 62 overlap with the spaces $65_B$. When there is no region where the signal lines 61 or the scan lines 62 overlap with the spaces $65_A$ or $65_B$ between the reflective electrodes 63 of the pixels 50, the entire areas of the spaces $65_A$ and $65_B$ can be used as the transmissive display regions, whereby the transmissive display performance can be improved.

As described above, using the spaces between the reflective electrodes 63 of the pixels 50 to perform transmissive display operation, that is, using the spaces as the transmissive display regions, eliminates the need to separately provide a transmissive display region in each of the pixels 50. As clearly shown from a comparison between FIGS. 3A and 4, when the sizes of the pixels 50 are the same in FIGS. 3A and 4, the size of the reflective electrodes 63 can be comparable to that in the reflective liquid crystal display apparatus, whereby transmissive display operation can be performed with the reflective display performance comparable to that of the reflective display apparatus.

2-1. Method for Driving Liquid Crystal Display Panel

In a liquid crystal display panel (liquid crystal display apparatus), to prevent specific resistance (resistance specific to substance) and other properties of a liquid crystal material from being degraded by keeping applying a DC voltage of a single polarity to the liquid crystal material, the liquid crystal display panel is so driven that the polarity of a video signal is inverted with respect to the common potential $V_{COM}$ at a predetermined cycle.

Known examples of the method for driving the liquid crystal display panel described above include a line inversion driving method, a dot inversion driving method, and a frame inversion driving method. In the line inversion driving method, the polarity of a video signal is inverted at a temporal cycle of 1H (H stands for horizontal period) corresponding to a single line (single pixel row). In the dot inversion driving method, the polarity of a video signal is inverted alternately among four pixels adjacent to each other in horizontal and vertical directions. In the frame inversion driving method, video signals written to all pixels for each frame corresponding to a single screen are inverted at once by using the same polarity.

In the semi-transmissive liquid crystal display apparatus according to the present embodiment, any of the driving methods described above can be employed. It is, however, noted that the frame inversion driving method is more preferable than the line inversion driving method and the dot inversion driving method from the reason described below.

The reason why the frame inversion driving method is preferable will be described with reference to simulation results shown in FIGS. 5A to 5C. FIG. 5A shows a simulation result obtained when no voltage is applied to the pixels 50. FIG. 5B shows a simulation result obtained when a voltage is applied to the pixels 50 in a line or dot inversion driving method. FIG. 5C shows a simulation result obtained when a voltage is applied to the pixels 50 in a frame inversion driving method. FIGS. 5B and 5C also show long-dashed and short-dashed, equipotential lines.

In the line or dot inversion driving method, since the potential between the transparent electrode (counter electrode) 21 and the reflective electrode (pixel electrode) 63 in one pixel differs from that in an adjacent pixel, the behavior of the liquid crystal molecules between the two pixels but in the vicinity of one of the two pixels differs from that in the vicinity of the other pixel, resulting in unstable alignment of liquid crystal molecules between the two pixels, which is also clear from the distribution of the long-dashed and short-dashed line, equipotential lines shown in FIG. 5B.

As described above, in the line or dot inversion driving method, in which there is a difference in potential between adjacent two pixels, the alignment of the liquid crystal molecules between the pixels may not be controlled in a stable manner, which means that when transmissive display operation is performed by using the spaces between the pixels where alignment of the liquid crystal molecules are not stable as the transmissive display regions, afterimages may disadvantageously appear.

In contrast, in the frame inversion driving method, since the potential between the transparent electrode 21 and the reflective electrode 63 in one pixel is equal to that in an adjacent pixel, the liquid crystal molecules between the pixels behave in the same manner in the vicinity of one of the two pixels and in the vicinity of the other pixel, resulting in more stable alignment of the liquid crystal molecules between the two pixels than in the line or dot inversion driving method, which is also clear from the distribution of the long-dashed and short-dashed line, equipotential lines shown in FIG. 5C.

As described above, in the frame inversion driving method, in which the potential in one pixel is equal to that in an adjacent pixel, the alignment of the liquid crystal molecules between the two pixels can be controlled in a relatively stable manner, which means that transmissive display operation performed by using the spaces between the two pixels as the transmissive display regions does not cause the problem of afterimages. From the reason described above, to perform transmissive display operation by using the spaces between the reflective electrodes 63 of the pixels 50, it is preferable to use the frame inversion driving method instead of the line or dot inversion driving method. It does not, however, mean as described above that the line or dot inversion driving method is excluded.

2-2. MIP Method

On the other hand, when the frame inversion driving method is used, there is a concern that shading occurs because signal voltages of the same polarity are applied to the signal lines for a period of one frame. To address the problem of shading, the semi-transmissive liquid crystal display apparatus according to the present embodiment uses what is called an MIP (memory in pixel) method along with the frame inversion driving method. In the MIP method, each of the pixels 50 is formed of a pixel having memory capability, for example, having a memory capable of storing data. In the MIP method, since a fixed voltage is typically applied to each pixel, the problem of shading can be solved.

Further, in the MIP method, in which a memory that stores data is built in each pixel, the display operation can be performed in an analog display mode and a memory display mode. In the analog display mode, the grayscale of a pixel is displayed in an analog manner. In the memory display mode, the grayscale of a pixel is displayed in a digital manner based on binary information (logic "1"/logic "0") stored in the memory of the pixel.

In the memory display mode, since the information held in each of the memories is used, it is not necessary to write a signal potential that reflects a grayscale at a frame cycle. The power consumption in the memory display mode is therefore lower than in the analog display mode, in which it is necessary to write a signal potential that reflects a grayscale at a frame cycle. In other words, the power consumption of the display apparatus can be reduced.

Figure 6:
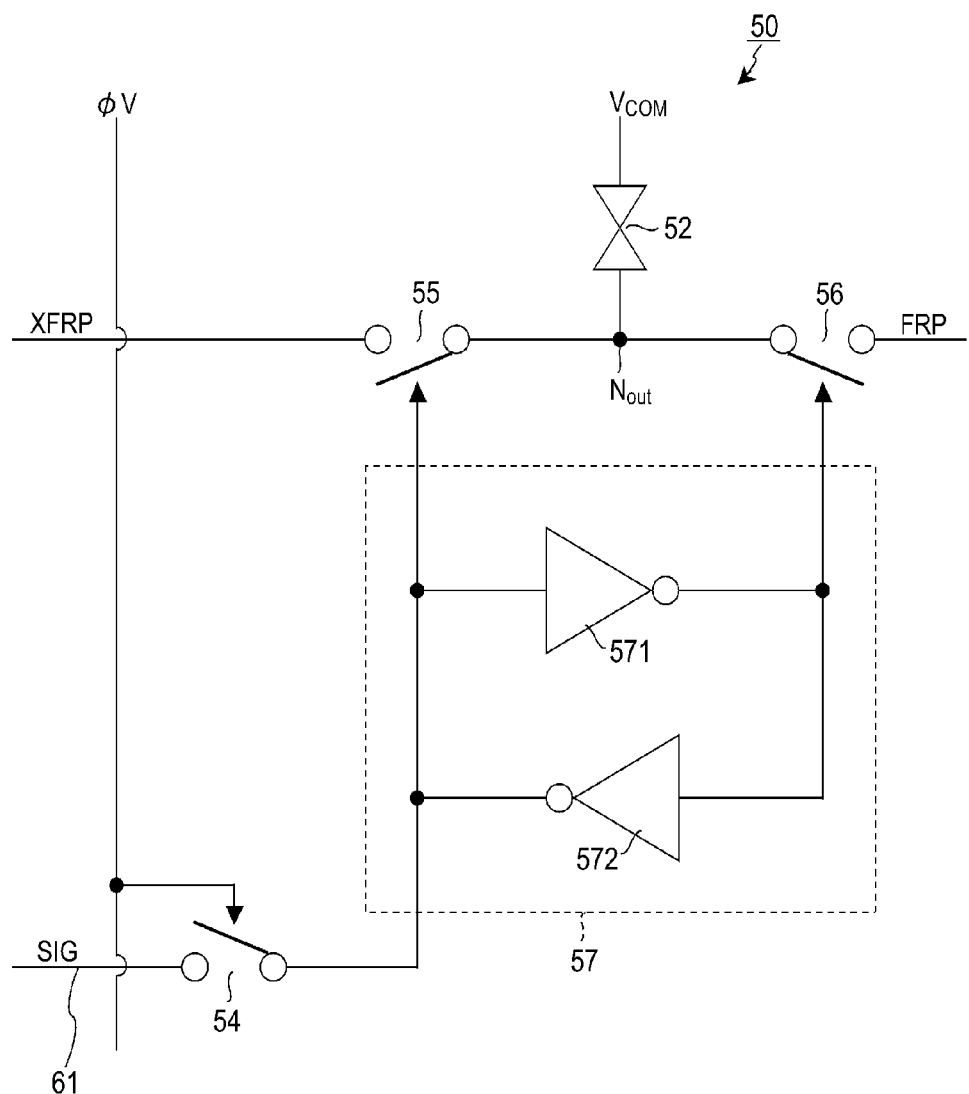
FIG. 6 is a block diagram showing an example of the circuit configuration of an MIP pixel.

FIG. 6 is a block diagram showing an example of the circuit configuration of an MIP pixel. In FIG. 6, the same portions as those in FIG. 2 have the same reference characters. FIG. 7 is a timing chart for describing the operation of the MIP pixel.

Each of the pixels 50 is formed of not only liquid crystal capacitance (liquid crystal cell) 52 but also three switching devices 54 to 56 and a latch unit 57 for SRAM capability, as shown in FIG. 6. The liquid crystal cell 52 means liquid crystal capacitance produced between the pixel electrode and the counter electrode facing the pixel electrode.

The switching device 54, which has an end connected to the corresponding one of the signal lines 61 (corresponding to signal lines $61_1$ to $61_3$ in FIG. 2), is turned on (closed) when the switching device 54 receives a scan signal 4V from the scan circuit 80 shown in FIG. 2, and acquires data SIG supplied from the signal output circuit 70 shown in FIG. 2 through the signal line 61. The latch unit 57, which is formed of inverters 571 and 572 connected in parallel but in opposite directions, holds (latches) a potential according to the data SIG acquired by the switching device 54.

One terminal of the switching device 55 receives control pulses XFRP having a phase opposite to that of the common potential $V_{COM}$, and one terminal of the switching device 56 receives control pulses FRP that are in phase with the common potential $V_{COM}$. The other terminal of each of the switching devices 55 and 56 is connected to a common connection node, which forms an output node $N_{out}$ of the present pixel circuit. One of the switching devices 55 and 56 is turned on in accordance with the polarity of the potential held by the latch unit 57. As a result, the control pulses FRP or the control pulses XFRP are applied to the pixel electrode (reflective electrode 63 in FIG. 4) of the liquid crystal capacitance 52, the counter electrode (transparent electrode 21 in FIG. 1) of which receives the common potential $V_{COM}$.

In the present embodiment, when the potential held by the latch unit 57 has a negative polarity, the pixel potential of the liquid crystal capacitance 52 becomes in phase with the common potential $V_{COM}$ and the pixel displays black, whereas when the potential held by the latch unit 57 has a positive polarity, the phase of the pixel potential of the liquid crystal capacitance 52 becomes opposite to the phase of the common potential $V_{COM}$ and the pixel displays white, as clearly shown in FIG. 7.

The above discussion clearly shows that in each of the MIP pixels 50, when one of the switching devices 55 and 56 is turned on in accordance with the polarity of the potential held by the latch unit 57, the control pulses FRP or the control pulses XFRP are applied to the pixel electrode (reflective electrode 63 in FIG. 4) of the liquid crystal capacitance 52, whereby a fixed voltage is therefore typically applied to each of the pixels 50, and no shading will occur at all.

The above description has been made with reference to the case where the memory built in each of the pixels 50 is an SRAM, but the SRAM is presented only by way of example. A DRAM or a memory having any other suitable configuration may be used.

2-3. Area-Based Grayscale Method

The MIP method only allows each of the pixels 50 to express two grayscales with one bit. To address the limitation, the semi-transmissive liquid crystal display apparatus according to the present embodiment, which uses the MIP method, preferably uses an area-based grayscale method as well. The area-based grayscale method used herein is a grayscales expression method for expressing four grayscales with two bits, for example, by weighting areas of a pixel (areas of pixel electrode) by a factor of 2:1. The area-based grayscale method will be described later in detail.

Specifically, in the area-based grayscale method, each of the reflective electrode 63, which is the reflective display region of each of the pixels 50, is divided into a plurality of pixel (sub-pixel) electrodes that are weighted in terms of area. A pixel potential selected by the potential held by the latch unit 57 is applied to the pixel electrodes weighted in terms of area for grayscale display operation based on the combination of the weighted areas.

The area-based grayscale method will be specifically described below. The area-based grayscale method is a grayscale expression method for expressing $2^N$ grayscales by using N weighted sub-pixel electrodes having area ratios of $2^0, 2^1, 2^2, \ldots, 2^{N-1}$. The area-based grayscale method is inherently used to improve or otherwise process unevenness in image quality due, for example, to variation in TFT characteristics. The semi-transmissive liquid crystal display apparatus according to the present embodiment uses an area-based grayscale method for expressing four grayscales with two bits by weighting areas (pixel areas) of each of the reflective electrodes 63, which are the pixel electrodes, by a factor of 2:1.

The pixel areas are typically weighted by a factor of 2:1 by dividing the pixel electrode of each of the pixels 50 into a sub-pixel electrode 501 having an area of 1 and a sub-pixel electrode 502 that is twice as large as the sub-pixel electrode 501 (having an area of 2), as shown in FIG. 8A. The configuration shown in FIG. 8A is, however, not preferable from the viewpoint of grayscale expression because the centroid of a pixel does not agree (coincide) with the centroid of the grayscales.

As a configuration that allows the centroid of a pixel to agree with the centroid of grayscales, a central portion of a sub-pixel electrode 504 having an area of 2 is hollowed to form an open rectangular region, and a sub-pixel electrode 503 having an area of 1 is disposed in a central portion of the open rectangular region, as shown in FIG. 8B. In the configuration shown in FIG. 8B, however, connecting portions $504_A$ and $504_B$ of the sub-pixel electrode 504, which are located on opposite sides of the sub-pixel electrode 503, are narrow in width, resulting in decrease in reflective area of the entire sub-pixel electrode 504 and difficulty in aligning the liquid crystal molecules in the vicinity of the connecting portions $504_A$ and $504_B$.

As described above, when a VA (vertically aligned) mode, in which the liquid crystal molecules are substantially perpendicular to the substrate when no electric field is produced, is used in the area-based grayscale method, it is difficult to align the liquid crystal molecules in a satisfactory manner because the way the voltage is applied to the liquid crystal molecules varies in accordance with the shape and size of the electrode and other factors. It is further difficult to design grayscales because the reflectance ratio does not necessarily correspond to the area ratio of the reflective electrode but the reflectance depends on the area of the reflective electrode, the alignment of the liquid crystal molecules, and other factors. In the configuration shown in FIG. 8A, the ratio in terms of electrode area is 1:2 but the ratio in terms of electrode circumferential length is not 1:2. The area ratio of the reflective electrode therefore does not necessarily correspond to the reflectance ratio.

From the viewpoints described above, when the area-based grayscale method is used, it is desirable to employ what is called a tripartite electrode configuration in which a pixel electrode is divided into three sub-pixel electrodes 505, $506_A$, and $506_B$ having the same area (size), as shown in FIG. 8C, in consideration of grayscale expression ability and effective use of the reflective area.

When the tripartite electrode configuration is used, the upper and lower two sub-pixel electrodes $506_A$ and $506_B$, which sandwich the central sub-pixel electrode 505, are handled as a single unit, and the two sub-pixel electrodes $506_A$ and $506_B$, which are handled as a single unit, are driven simultaneously. In this way, the pixel area of the sub-pixel electrodes $506_A$ and $506_B$ and the pixel area of the central sub-pixel electrode 505 are weighted by a factor of 2:1. Further, the centroid of a pixel agrees with the centroid of the grayscales.

To drive the two sub-pixel electrodes $506_A$ and $506_B$ simultaneously, the two sub-pixel electrodes $506_A$ and $506_B$ are preferably electrically connected to each other, as indicated by the broken line in FIG. 8C. Electrically connecting the two sub-pixel electrodes $506_A$ and $506_B$ allows a single drive circuit to drive the two sub-pixel electrodes $506_A$ and $506_B$. The configuration of the pixel circuit can therefore be simpler than in a case where the two sub-pixel electrodes $506_A$ and $506_B$ are driven by separate drive circuits.

In the above description, the area-based grayscale method is used along with the MIP method by way of example, but a time division grayscale method or any other suitable grayscale method may be used along with the MIP method. In the time division grayscale method, however, the pixel potential changes with time even in a still image, and the liquid crystal molecules move in a pixel and in the space between pixels. The area-based grayscale method is therefore more preferable than the time division grayscale method. The area-based grayscale method is also more advantageous in terms of panel transmittance than in a case where no division is made because dividing the pixel electrode, that is, the reflective electrode 63, increases the area of the gap between the electrodes.

Further, in the example described above, an MIP pixel having a memory capable of storing data on a pixel basis is used as a pixel having memory capability, but the MIP pixel is presented only by way of example. Other pixels having memory capability, such as a pixel using a known memory liquid crystal material, can be used instead of the MIP pixel.

2-4. Display Mode

The liquid crystal display mode is classified into a normally white mode in which a pixel displays white when no electric field (voltage) is applied whereas displaying black when an electric field is applied and a normally black mode in which a pixel displays black when no electric field is applied whereas displaying white when an electric field is applied. Liquid crystal cells used to perform the two modes have the same structure but have the polarizers 11 and 26 in FIG. 1 differently disposed.

When transmissive display operation is performed by using the spaces between the reflective electrodes 63 of the pixels 50, all the liquid crystal molecules between the pixels are not switched, but liquid crystal molecules in some regions do not move. In the normally white mode, the contrast could disadvantageously decrease because the presence of regions where liquid crystal molecules do not move prevents fully black display.

Figure 9:
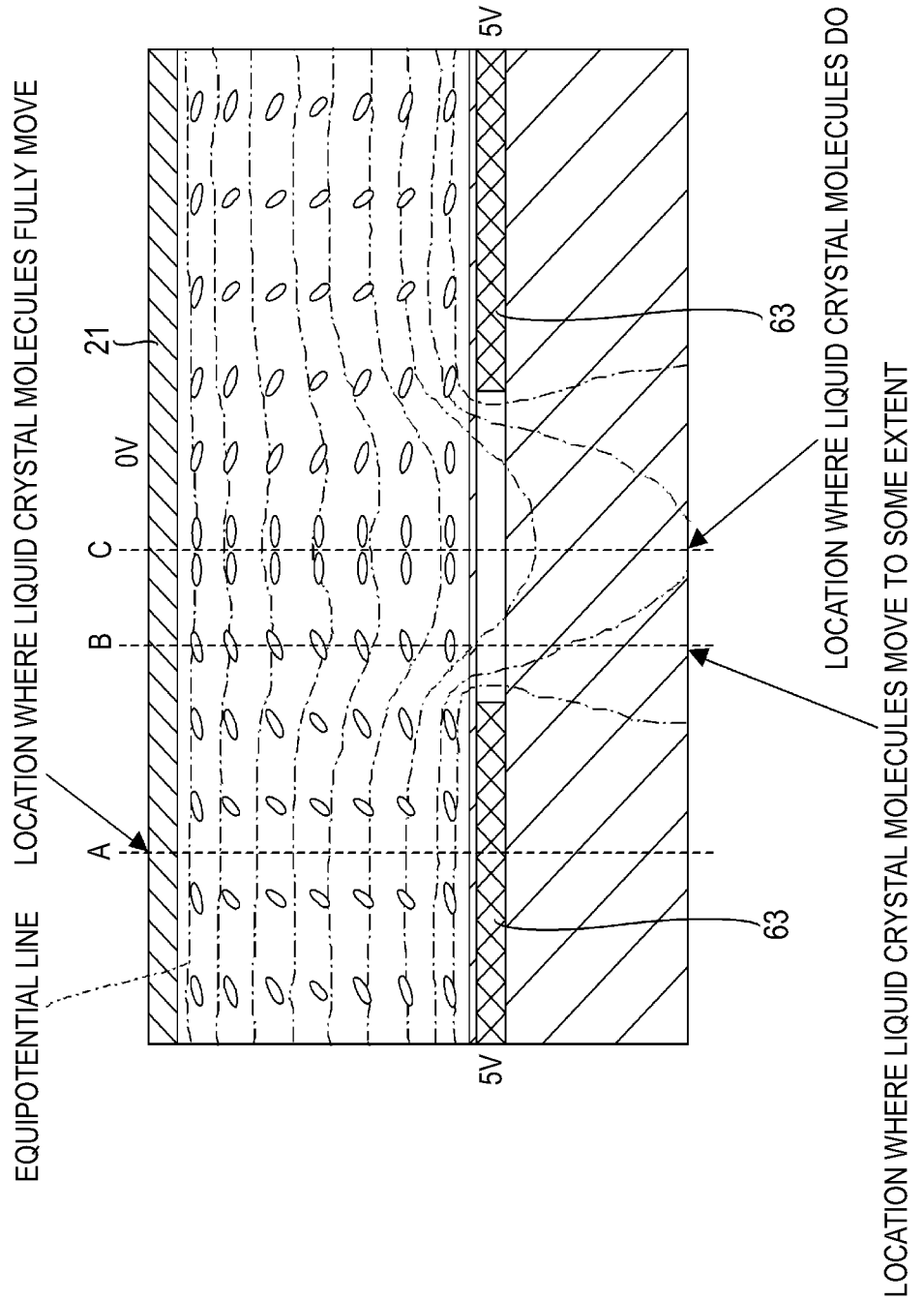
FIG. 9 shows motion of liquid crystal molecules between pixels at the time of transmissive display operation performed by using a space between reflective electrodes of the pixels.

FIG. 9 shows motion of the liquid crystal molecules between pixels at the time of transmissive display operation performed by using the spaces between the reflective electrodes 63 of the pixels. In FIG. 9, the liquid crystal molecules fully move at a location A above a central portion of the reflective electrode 63. In contrast, the liquid crystal molecules at a location B between the pixels but in the vicinity of the reflective electrode 63 move to some extent, and the liquid crystal molecules at a location C in a central portion between the pixels do not move at all.

As a result, in the central portion between the pixels where the liquid crystal molecules do not move at all, the transmittance becomes significantly higher than that in the region where the reflective electrode 63 is present, resulting in light leakage. Fully black display is therefore not achieved, resulting in a decrease in contrast.

Figure 10:
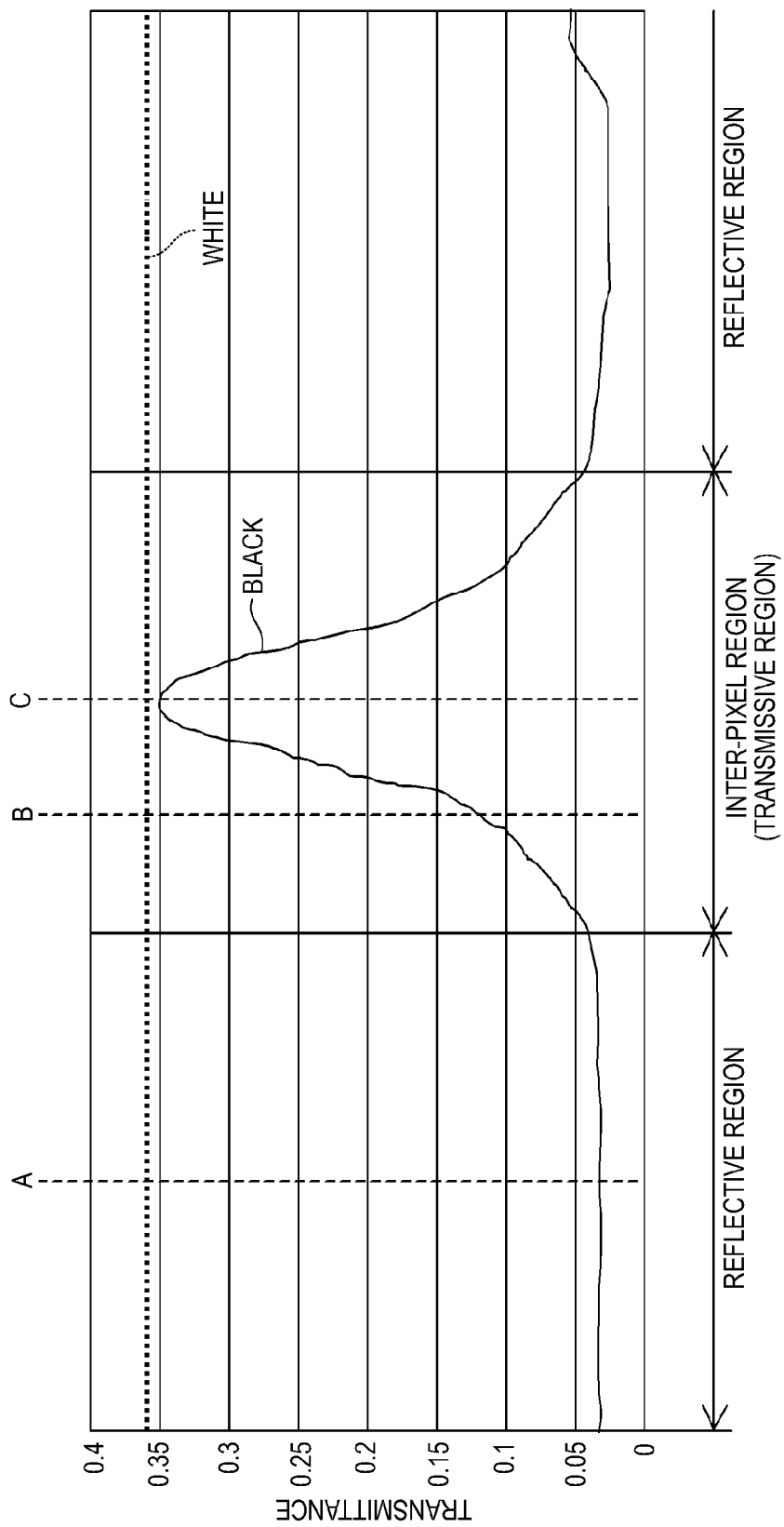
FIG. 10 shows a result of a simulation of transmittance of the space between pixels in a normally white mode.

FIG. 10 shows a result of a simulation of transmittance of the space between pixels in the normally white mode. In FIG. 10, positions A, B, and C correspond to the locations A, B, and C in FIG. 9. The simulation result shown in FIG. 10 indicates that the transmittance at the location C in the central portion between the pixels in FIG. 9 is disadvantageously high (about 0.35, for example) because the liquid crystal molecules there do not move at all.

From the reason described above, it is preferable to use the normally black mode as the display mode of the semi-transmissive liquid crystal display apparatus according to the present embodiment. Since the normally black mode provides black display when no voltage is applied to the liquid crystal material, that is, when the liquid crystal molecules are uniformly aligned, and hence provides fully black display, the contrast can be increased. It does not, however, mean that the normally white mode is excluded.

An example of measured optical characteristics follows: In the normally white mode, white transmittance (%) is about 0.93, and black transmittance (%) is about 0.29, providing a contrast of about 3. In the normally black mode, white transmittance (%) is about 0.71, and black transmittance (%) is about 0.06, providing a contrast of about 12. That is, using the normally black mode allows the contrast to be about four times higher than that in the normally white mode.

2-5. Specific Examples

Specific examples of the semi-transmissive liquid crystal display apparatus according to the present embodiment will be described below. The following description will be made with reference to a case where the normally black mode is used as the display mode and an ECB (electrically controlled birefringence) mode is used as the operation mode. The operation mode is not limited to the ECB mode but may alternatively be the VA (vertically aligned) mode or an FFS (fringe field switching) mode.

Figure 11:
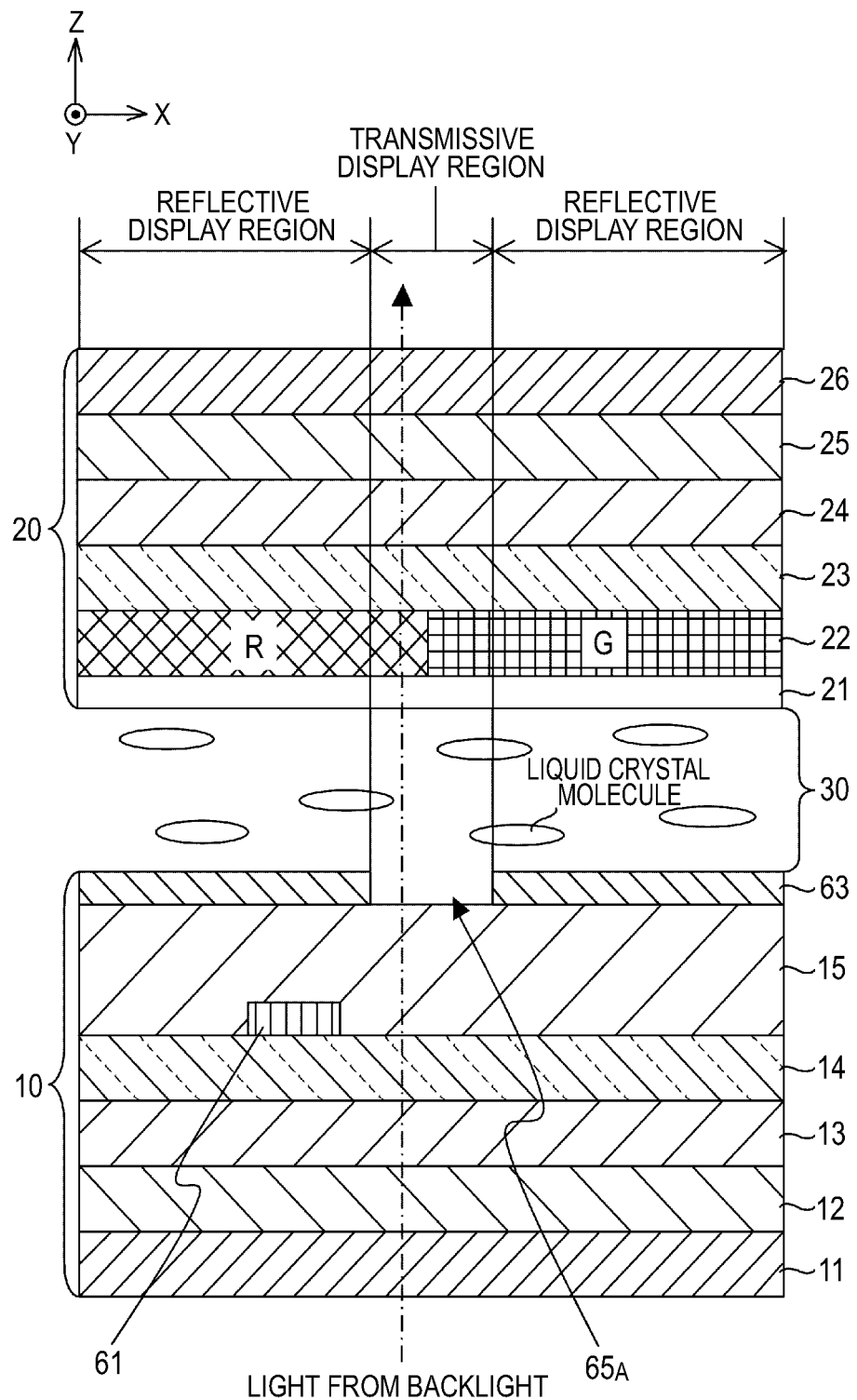
FIG. 11 is a cross-sectional view showing a cross-sectional structure of two pixels adjacent in a row direction of a semi-transmissive liquid crystal display apparatus having a single-gap structure.

FIG. 11 is a cross-sectional view showing a cross-sectional structure of two pixels adjacent in the row direction (X direction) of the semi-transmissive liquid crystal display apparatus according to an example of the present embodiment. In FIG. 11, the same portions as those in FIG. 1 have the same reference characters.

A first panel section 10 has a polarizer 11, a half-wave plate 12, a quarter-wave plate 13, a first substrate 14, which is a TFT substrate, and a planarization film 15 provided in this order from the side facing away from a liquid crystal layer 30, and a reflective electrode 63 is formed on the planarization film 15 for each pixel, as shown in FIG. 11.

In the first panel section 10, the reflective electrodes 63 are so formed that the size thereof is substantially the same as that of the pixels. The reflective electrodes 63 form reflective display regions (reflective display sections). Further, a space 65$_A$ is formed along the column direction (Y direction) between the reflective electrodes 63 of two pixels adjacent in the row direction (X direction). Although not shown in the cross-sectional view, a space 65$_B$ is formed along the row direction between the reflective electrodes 63 of two pixels adjacent in the column direction, as shown in FIG. 4.

Signal lines 61 that transmit video signals to the pixels on a pixel column basis are wired on the first substrate 14. The signal lines 61 are so formed in the reflective display regions that the signal lines do not block the spaces 65$_A$ extending along the column direction, preferably the signal lines do not overlap with the spaces 65$_A$. Although not shown in the cross-sectional view, scan lines 62 (see FIG. 4) that transmit scan signals to the pixels on a pixel row basis are so formed in the reflective display regions that the scan lines do not block the spaces 65$_B$ extending along the row direction, preferably the scan lines do not overlap with the spaces 65$_B$.

The spaces 65$_A$ and 65$_B$ between the reflective electrodes 63 of the pixels, where the signal lines 61 or the scan line 62 do not overlap with the spaces, are used as transmissive display regions. The pixel structure according to the present example is a single-gap structure in which the thickness of the liquid crystal layer 30, that is, the cell gap, is the same in the reflective display regions and the transmissive display regions.

A second panel section 20, which faces the first panel section 10 with the liquid crystal layer 30 therebetween, has a transparent electrode 21, a color filter 22, a second substrate 23, a quarter-wave plate 24, a half-wave plate 25, and a polarizer 26 provided in this order from the side where the liquid crystal layer 30 is present. The pixel structure shown in FIG. 11 involves two pixel adjacent in the row direction, for example, an R sub-pixel that displays R (red) and a G sub-pixel that displays G (green).

Figure 12:
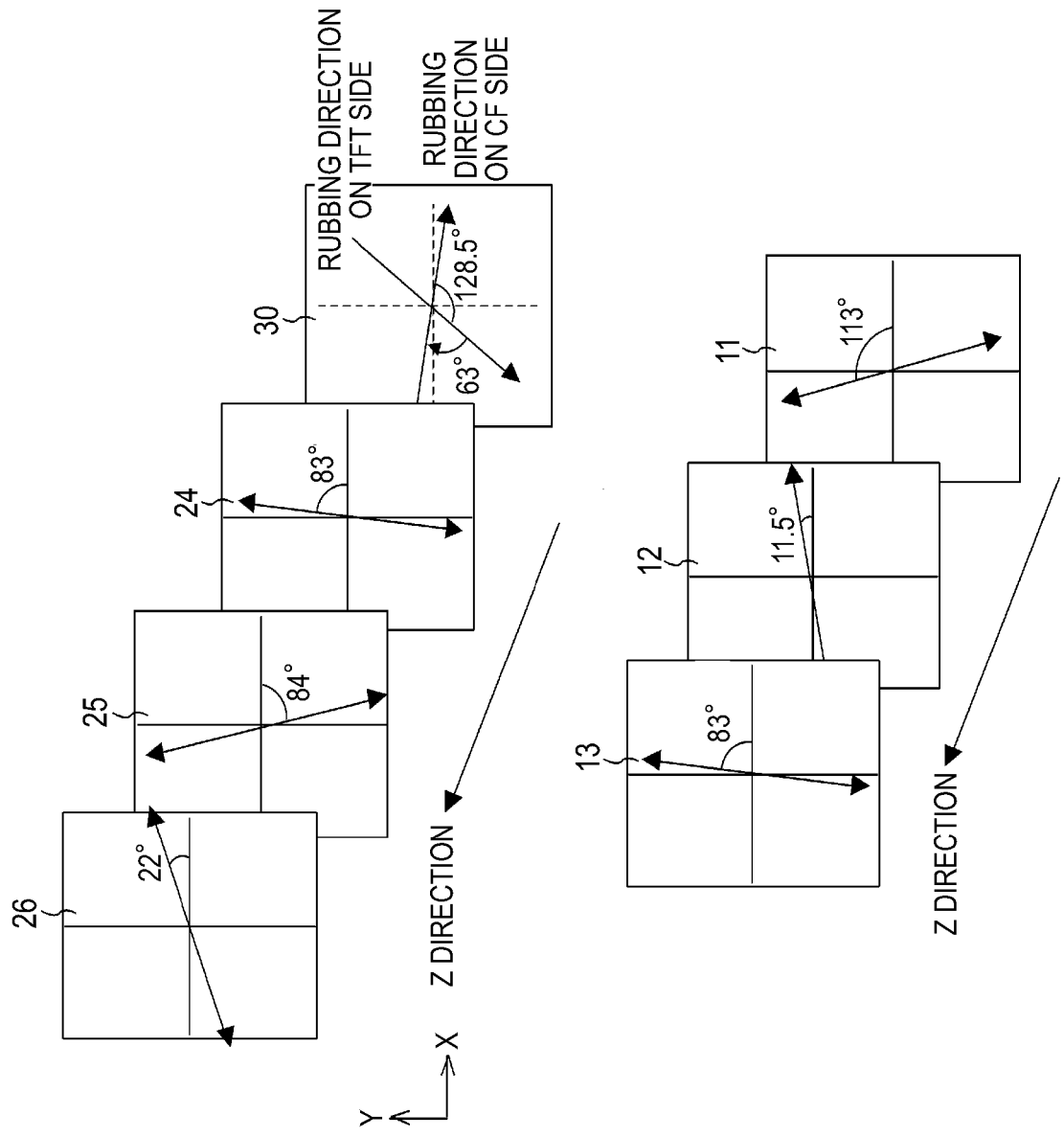
FIGS. 12A and 12B show an example of optical design in a normally-black ECB mode in the single-gap structure.

FIGS. 12A and 12B show an example of optical design in the normally-black ECB mode in the single-gap structure described above. FIGS. 12A and 12B show the directions of axes of components of the first panel section 10, the liquid crystal cell (liquid crystal layer 30), and components of the second panel section 20. Specifically, the following directions of the components of the first panel section 10 are shown: the direction of the absorption axis of the polarizer 11; the direction of the stretching axis of the half-wave plate 12; and the direction of the stretching axis of the quarter-wave plate 13. Further, the following directions of the components of the second panel section 20 are shown: the rubbing directions on the sides of the liquid crystal cell where the TFT substrate and the CF substrate are present; the direction of the stretching axis of the quarter-wave plate 24; the direction of the stretching axis of the half-wave plate 25; and the absorption axis of the polarizer 26.

In FIGS. 12A and 12B, the values represent angles of the directions of the axes and phase difference (retardation) in the directions of the axes. The phase difference is expressed in wavelength in a case where light of a wavelength of 550 [m] is incident on the relevant component of the first panel section 10 and the second panel section 20.

The above specific example has been described with reference to the single-gap structure, but a multi-gap structure shown in FIG. 13 in which the cell gap in the reflective display regions differs from the cell gap in the transmissive display regions may be used.

Figure 13:
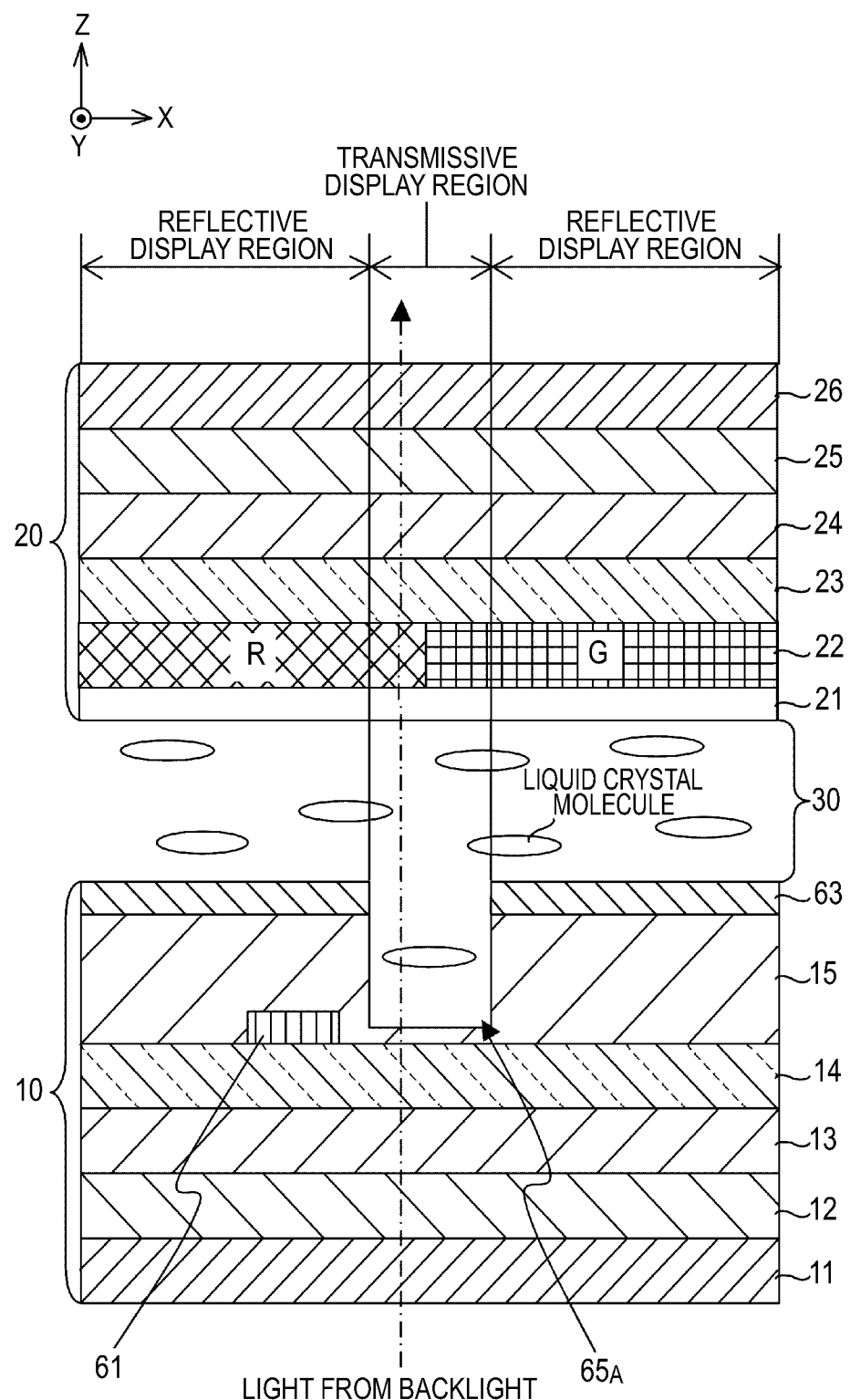
FIG. 13 is a cross-sectional view showing a cross-sectional structure of two pixels adjacent in a row direction of a semi-transmissive liquid crystal display apparatus having a multi-gap structure.

It is, however, noted that the number of processes carried out to form the multi-gap structure is greater than the number of processes carried out to form the single-gap structure because it is necessary to form a groove in each of the spaces $65_A$ ($65_B$) between the reflective electrodes 63 of the pixels so as to form steps between the reflective display regions and the transmissive display regions, as shown in FIG. 13. From the viewpoint of process, the single-gap structure, which typically requires a smaller number of processes, is therefore more preferable than the multi-gap structure.

Figure 14:
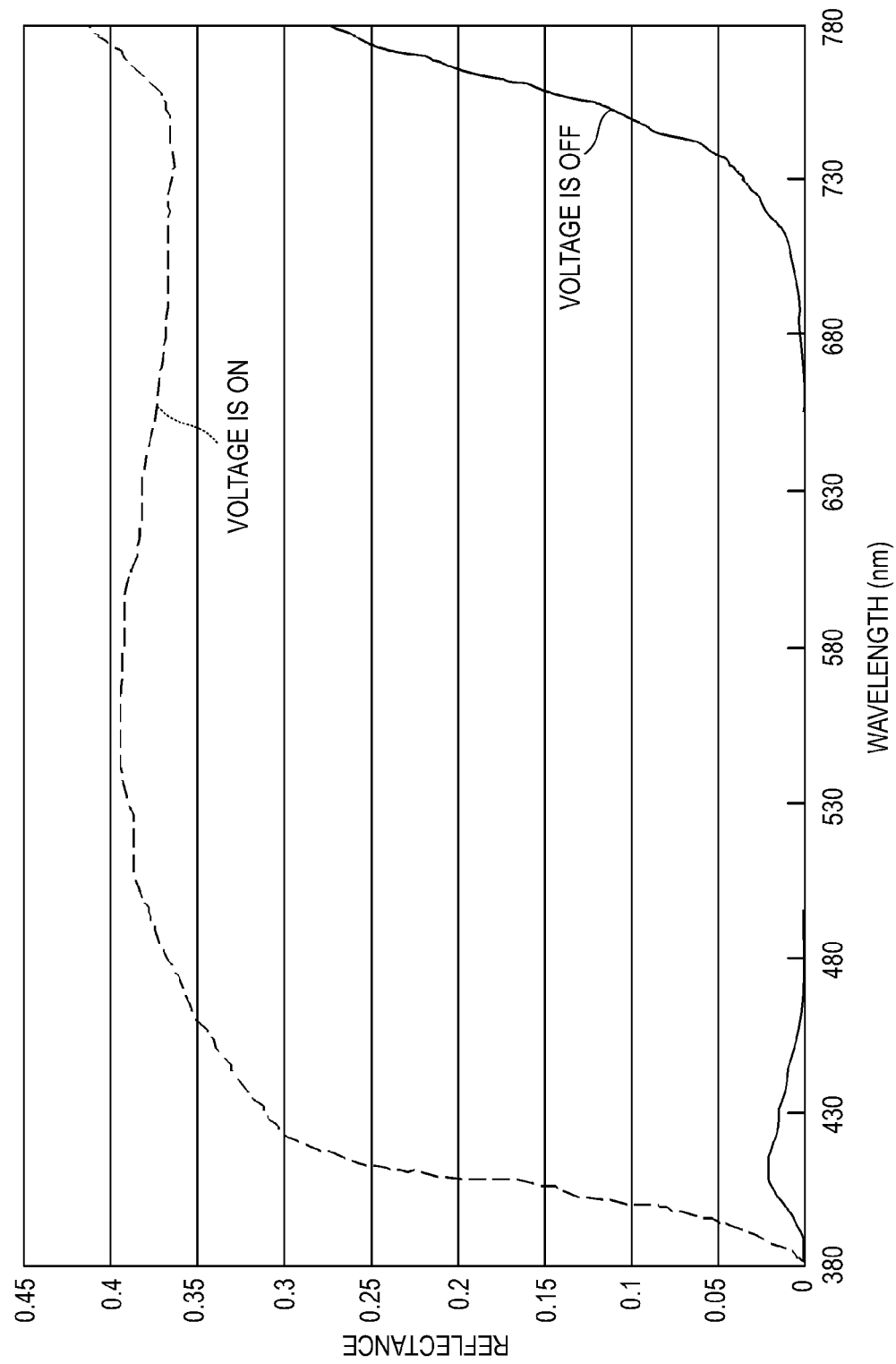
FIG. 14 shows a calculated spectrum of the reflectance of reflective display regions.
Figure 15:
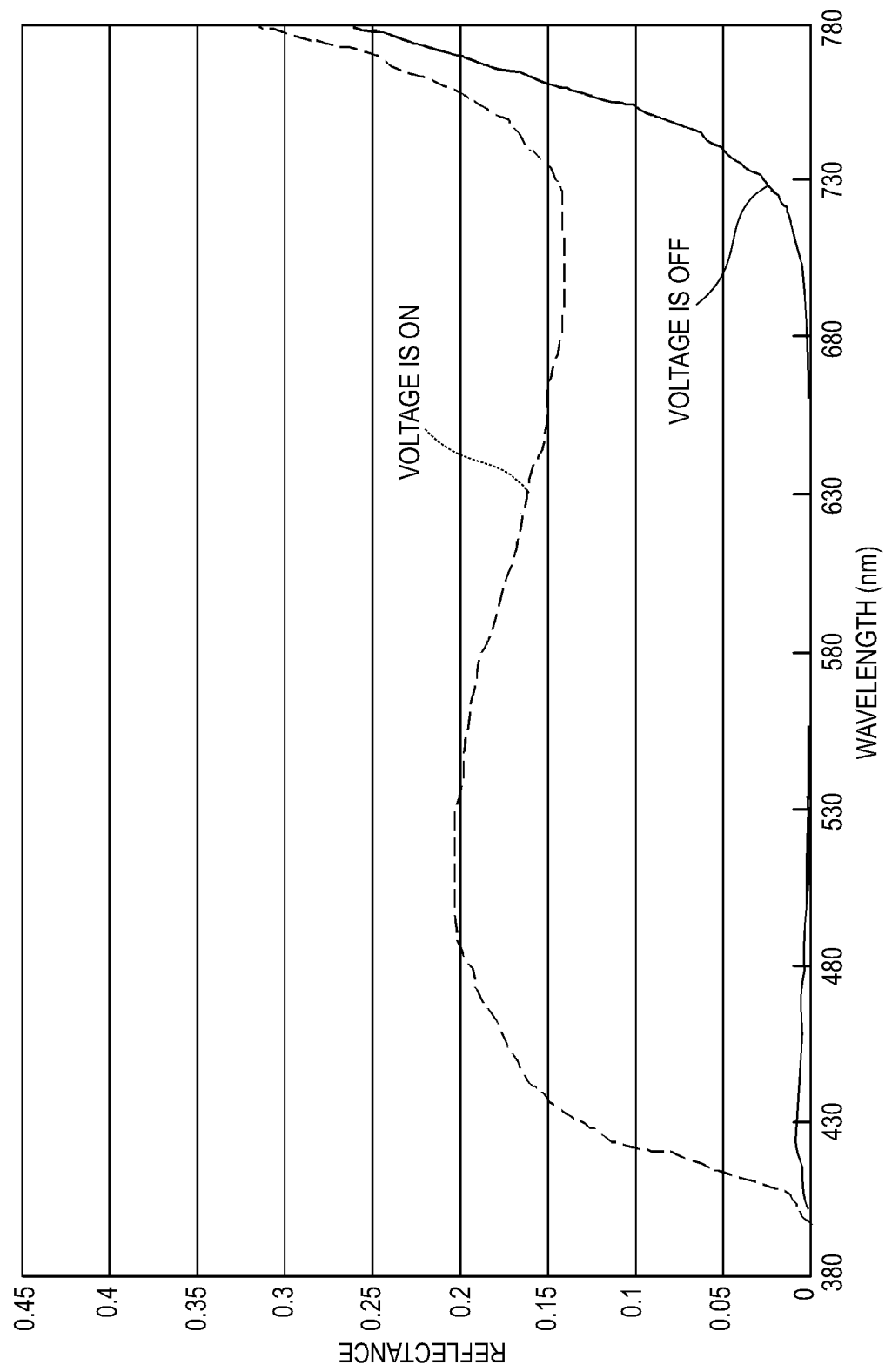
FIG. 15 shows a calculated spectrum of the reflectance of transmissive display regions.

FIGS. 14 and 15 show spectra of the reflectance of the reflective display regions and the reflectance of the transmissive display regions calculated when the voltage between the upper counter electrode (transparent electrode 21) and the lower pixel electrode (reflective electrode 63) in the optical design (single-gap structure) shown in FIGS. 12A and 12B is ON and OFF. The term "voltage is ON" means a state in which a voltage is applied between the upper and lower electrodes, and the term "voltage is OFF" means a state in which no voltage is applied between the upper and lower electrodes.

FIG. 14 shows a calculated spectrum of the reflectance of the reflective display regions, and FIG. 15 shows a calculated spectrum of the reflectance of the transmissive display regions. The calculated spectra do not reflect an electric field distribution between the pixels but represent a state in which the electric field between the upper and lower electrodes is fully applied to the liquid crystal molecules. Since the structure is the single-gap structure, the transmittance of the transmissive display regions is low because the phase difference therein is small, unlike a typical semi-transmissive multi-gap structure.

3. Variation

The embodiment described above has a wiring structure in which the signal lines 61 and the scan line 62 are linear stripe-shaped wiring lines, the signal lines 61 cross the pixels between the spaces $65_B$ extending in the row direction, and the scan line 62 cross the pixels between the spaces $65_A$ extending in the column direction (see FIG. 4). The wiring structure of the signal lines 61 and the scan line 62 is presented by way of example and is not limited to the one described above.

For example, it is conceivable to employ a wiring structure shown in FIG. 16 in which the signal lines 61 and the scan line 62 are bent, serpentine wiring lines wired as follows: That is, the signal lines 61 are so wired that they pass through intersections $65_C$ of the spaces $65_A$ formed along the column direction and the spaces $65_B$ formed along the row direction between the pixels adjacent in the row direction, specifically, bent portions $61_A$ of the signal lines 61 are positioned at the intersections $65_C$. Further, the scan line 62 are so wired that they pass through the intersections $65_C$ of the spaces $65_B$ formed along the row direction and the spaces $65_A$ formed along the column direction between the pixels adjacent in the column direction, specifically, bent portions $62_A$ of the scan line 62 are positioned at the intersections $65_C$.

Since the liquid crystal molecules do not move at all at the location C in the central portion between the pixels as described above with reference to FIGS. 9 and 10, the centers of the intersections $65_C$ of the spaces $65_A$ formed along the column direction and the spaces $65_B$ formed along the row direction conceivably most adversely affect the transmissive display operation. It is therefore believed that the transmissive display operation can be performed more satisfactorily by wiring the signal lines 61 and the scan line 62 through the intersections $65_C$ in the wiring structure described above than in a case where the signal lines 61 and the scan line 62 simply pass through the pixels between the spaces $65_A$ and $65_B$.

4. Electronic Systems

The semi-transmissive display apparatus according to the embodiment of the present disclosure described above can be used as a display section (display apparatus) of an electronic system in every field in which a video signal inputted to the electronic system or a video signal produced in the electronic system is displayed as an image or video images.

The semi-transmissive display apparatus according to the embodiment of the present disclosure is preferably used as a display section (display apparatus) of a mobile terminal device frequently used in outdoor settings among electronic systems in all conceivable fields. Examples of the mobile terminal device may include digital cameras, video camcorders, PDA (personal digital assistants), game consoles, notebook personal computers, electronic books, and other mobile information devices, and mobile phones and other mobile communication devices.

As clearly shown in the description of the above embodiment, the semi-transmissive display apparatus according to the embodiment of the present disclosure can perform transmissive display operation while maintaining reflective display performance comparable to that of a reflective display apparatus, whereby the characteristics of low power consumption and high screen visibility even in a bright environment, which are characteristics of a reflective liquid crystal display apparatus, can be fully achieved. Using the semi-transmissive display apparatus according to the embodiment of the present disclosure as a display section of an electronic system in every field, particularly, a mobile terminal device, therefore greatly contributes to reduced power consumption of the mobile terminal device.

A description will be made of specific examples of an electronic system using the semi-transmissive display apparatus according to the embodiment of the present disclosure as a display section, that is, an electronic system according to an embodiment of the present disclosure.

Figure 17A:
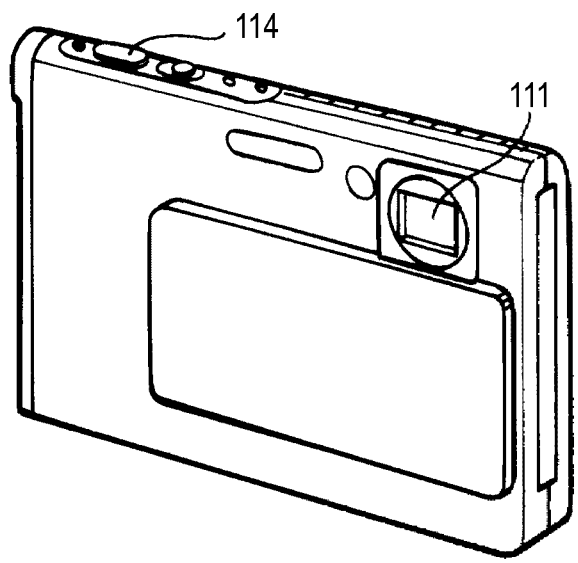
FIGS. 17A and 17B are perspective views showing the exterior appearance of a digital camera to which the present disclosure is applied, FIG. 17A being a perspective view of the digital camera viewed from the front side and FIG. 17B being a perspective view of the digital camera viewed from the rear side.
Figure 17B:
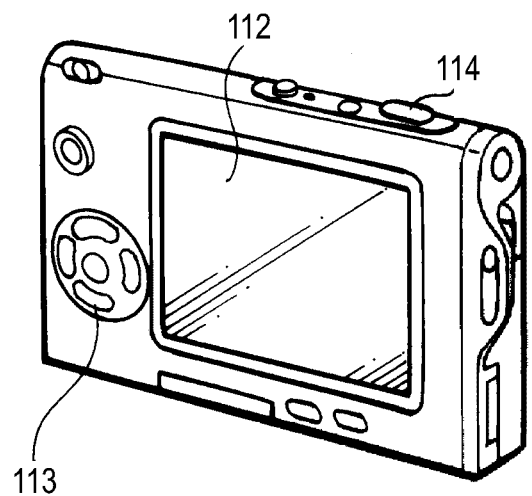

FIGS. 17A and 17B are perspective views showing the exterior appearance of a digital camera to which the present disclosure is applied. FIG. 17A is a perspective view of the digital camera viewed from the front side, and FIG. 17B is a perspective view of the digital camera viewed from the rear side. The digital camera according to the present application example is so manufactured that it includes a light emitter 111 as a flashlight, a display section 112, a menu switch 113, a shutter button 114, and other components, and that the semi-transmissive display apparatus according to the embodiment of the present disclosure is used as the display section 112.

Figure 18:
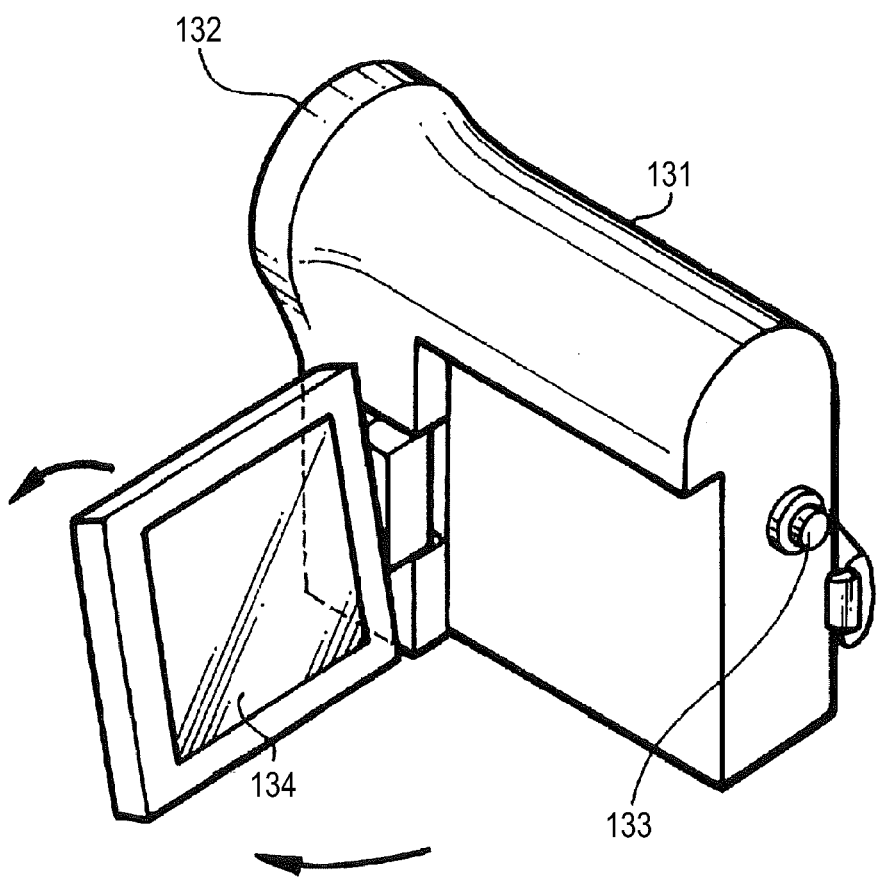
FIG. 18 is a perspective view showing the exterior appearance of a video camcorder to which the present disclosure is applied.

FIG. 18 is a perspective view showing the exterior appearance of a video camcorder to which the present disclosure is applied. The video camcorder according to the present application example is so manufactured that it includes a body 131, a subject imaging lens 132 located on the side facing forward, an imaging start/stop switch 133, a display section 134, and other components, and that the semi-transmissive display apparatus according to the embodiment of the present disclosure is used as the display section 134.

Figure 19:
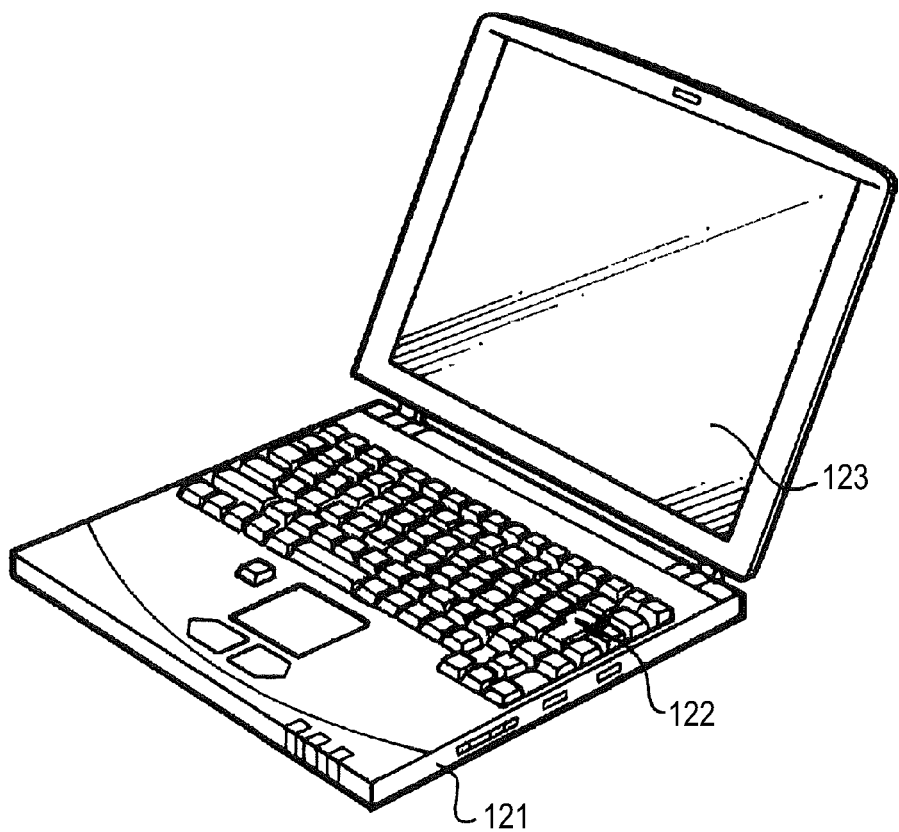
FIG. 19 is a perspective view showing the exterior appearance of a notebook personal computer to which the present disclosure is applied.

FIG. 19 is a perspective view showing the exterior appearance of a notebook personal computer to which the present disclosure is applied. The notebook personal computer according to the present application example is so manufactured that it includes a body 121, a keyboard 122 operated by a user to input characters and other information, a display section 123 that displays an image, and other components, and that the semi-transmissive display apparatus according to the embodiment of the present disclosure is used as the display section 123.

FIGS. 20A to 20G show the exterior appearance of a mobile communication device, for example, a mobile phone, to which the present disclosure is applied. FIG. 20A is a front view of the mobile phone in an open state. FIG. 20B is a side view of the mobile phone in the open state. FIG. 20C is a front view of the mobile phone in a closed state. FIG. 20D is a left side view of the mobile phone in the closed state. FIG. 20E is a right side view of the mobile phone in the closed state. FIG. 20F is a top view of the mobile phone in the closed state. FIG. 20G is a bottom view of the mobile phone in the closed state.

The mobile phone according to the present application example is so manufactured that it includes an upper housing 141, a lower housing 142, a connection section (hinge in the application example) 143, a display 144, a sub-display 145, a picture light 146, a camera 147, and other components, and that the semi-transmissive display apparatus according to the embodiment of the present disclosure is used as the display 144 and the sub-display 145.

5. Configuration of Present Disclosure

The present disclosure may be implemented as the following configurations.

(1) A semi-transmissive display apparatus including
a reflective electrode provided for each pixel,
wherein the semi-transmissive display apparatus performs reflective display operation by using the reflective electrodes and transmissive display operation by using spaces between the reflective electrodes of the pixels.

(2) The semi-transmissive display apparatus described in (1),
wherein wiring lines are formed not to block the spaces between the reflective electrodes of the pixels.

(3) The semi-transmissive display apparatus described in (2),
wherein the wiring lines are formed in positions other than the spaces between the reflective electrodes of the pixels.

(4) The semi-transmissive display apparatus described in (3),
wherein the wiring lines are signal lines that are formed on a pixel column basis with respect to the pixels arranged in rows and columns and transmit signals for driving the pixels, and
the signal lines are wired in positions other than the spaces formed between the pixels and along the direction in which the pixels in the pixel columns are arranged.

(5) The semi-transmissive display apparatus described in (4),
wherein between the pixels adjacent in the direction in which the pixels in the pixel rows are arranged, the signal lines are so wired that the signal lines pass through intersections of the spaces formed along the direction in which the pixels in the pixel columns are arranged and the spaces formed along the direction in which the pixels in the pixel rows are arranged.

(6) The semi-transmissive display apparatus described in (3) or (4),
wherein the wiring lines are scan lines that are formed on a pixel row basis with respect to the pixels arranged in rows and columns and transmit signals for selecting the pixels, and
the scan lines are wired in positions other than the spaces formed between the pixels and along the direction in which the pixels in the pixel rows are arranged.

(7) The semi-transmissive display apparatus described in (6),
wherein between the pixels adjacent in the direction in which the pixels in the pixel columns are arranged, the scan lines are so wired that the scan lines pass through intersections of the spaces formed along the direction in which the pixels in the pixel rows are arranged and the spaces formed along the direction in which the pixels in the pixel columns are arranged.

(8) The semi-transmissive display apparatus described in any of (1) to (7),
wherein each of the pixels has a liquid crystal layer provided between the corresponding reflective electrode and a common counter electrode facing the reflective electrode.

(9) The semi-transmissive display apparatus described in (8),
wherein frame inversion driving operation is performed whenever a frame is changed to invert the polarities of signals for driving the pixels in such a way that the polarities are changed to the same polarity for all the pixels.

(10) The semi-transmissive display apparatus described in (8) or (9),
wherein a display mode is a normally black mode.

(11) The semi-transmissive display apparatus described in (8),
wherein each of the pixels has memory capability.

(12) The semi-transmissive display apparatus described in any of (8) to (11),
wherein each of the pixels has a memory that stores data.

(13) The semi-transmissive display apparatus described in (11),
wherein each of the pixels uses a memory liquid crystal material.

(14) The semi-transmissive display apparatus described in (10),
wherein the reflective electrode of each of the pixels is divided into a plurality of electrodes, and
an area-based grayscale operation is performed to display grayscales based on a combination of the areas of the plurality of electrodes.

(15) The semi-transmissive display apparatus described in (14),
wherein each of the reflective electrodes is divided into three electrodes, and
2:1 area-based grayscale operation is performed based on a combination of the areas of two of the three electrodes and the area of the remaining one electrode.

(16) The pixel structure described in (15),
wherein the two electrodes and the one electrode have the same size.

(17) The pixel structure described in (15) or (16), wherein the two electrodes sandwich the one electrode.

(18) The pixel structure described in any of (15) to (17),
wherein the two electrodes are electrically connected to each other.

(19) A method for driving a semi-transmissive display apparatus including a reflective electrode provided for each pixel, the method including
performing reflective display operation by using the reflective electrodes, and
performing transmissive display operation by using spaces between the reflective electrodes of the pixels.

(20) An electronic system including
a semi-transmissive display apparatus having a reflective electrode provided for each pixel,
wherein the semi-transmissive display apparatus performs reflective display operation by using the reflective electrodes, and
the semi-transmissive display apparatus performs transmissive display operation by using spaces between the reflective electrodes of the pixels.

The present disclosure contains subject matter related to that disclosed in Japanese Priority Patent Application JP 2011-128854 filed in the Japan Patent Office on Jun. 9, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. A semi-transmissive display apparatus comprising:
a plurality of signal lines and a plurality of scan lines formed on a first substrate;
a plurality of pixels arranged in rows and columns at intersections of the plurality of signal lines and the plurality of scan lines;
a respective reflective electrode arranged in each of the plurality of pixels;
a transparent electrode formed on a second substrate facing the first substrate;
and a liquid crystal layer between the reflective electrodes and the transparent electrode;
wherein:
the reflective electrodes include openings,
each of the pixels has a memory;
the reflective electrode in each of the pixels is divided into a plurality of sub-electrodes that are weighted in terms of area,
and the display apparatus is configured to perform an area-based grayscale operation to express gray scales based on a combination of the areas of sub-electrodes,
wherein the reflective electrodes are formed on a planarization film with a portion of the planarizing film between reflective electrodes being removed in a transmissive region.
2. The semi-transmissive display apparatus according to claim 1, wherein a frame inversion driving operation is performed whenever a frame is changed to invert the polarities of signals for driving the pixels in such a way that the polarities are changed to the same polarity for all the pixels.
3. The semi-transmissive display apparatus according to claim 2, wherein each of the pixels has a memory that stores data.
4. The semi-transmissive display apparatus according to claim 1, wherein a display mode is a normally black mode.
5. The semi-transmissive display apparatus according to claim 4, wherein:
the reflective electrode in each of the pixels is divided into three electrodes,
and 2:1 area-based grayscale operation is performed based on a combination of the areas of two of the three electrodes and the area of the remaining one electrode of the three electrodes.
6. The semi-transmissive display apparatus according to claim 5, wherein the two electrodes and the one electrode have the same size.
7. The semi-transmissive display apparatus according to claim 5, wherein the two electrodes sandwich the one electrode.
8. The semi-transmissive display apparatus according to claim 5, wherein the two electrodes are electrically connected to each other.
9. The semi-transmissive display apparatus according to claim 1, wherein each of the pixels uses a memory liquid crystal material.
10. The semi-transmissive display apparatus according to claim 1, wherein the signal lines are serpentine wiring lines having bent portions, and the bent portions are positioned at the intersections.
11. The semi-transmissive display apparatus according to claim 1, wherein the scan lines are serpentine wiring lines having bent portions, and the bent portions are positioned at the intersections.
12. The semi-transmissive display apparatus according to claim 1, wherein:
during reflective display operation, external light is reflected by the reflective electrodes, and
during transmissive display operation, light passes through the transparent electrode through the opening.
13. The semi-transmissive display apparatus according to claim 1, wherein:
each reflective electrode has N sub-electrodes,
the grayscale operation expresses $2^N$ grayscales,
the sub-electrodes have area ratios of $2^0$ to $2^{N-1}$, both inclusive, and
N is a natural number greater than one.
14. A method for driving a semi-transmissive display apparatus including
(a) a plurality of signal lines and a plurality of scan lines formed on a first substrate,
(b) a plurality of pixels arranged in rows and columns at intersections of the plurality of signal lines and the plurality of scan lines, each pixel having a memory,
(c) a respective reflective electrode arranged in each of the plurality of pixels, each reflective electrode comprised of sub-electrodes that are weighted in terms of area,
(d) a transparent electrode formed on a second substrate faced to the first substrate, and
(e) a liquid crystal layer between the reflective electrode and the transparent electrode,
the method comprising:
performing reflective display operation by using the reflective electrodes, performing transmissive display operation by using spaces between the reflective electrodes of the pixels,
and performing an area-based grayscale operation to express display gray scales based on a combination of the areas of the plurality of electrodes
wherein the reflective electrodes are formed on a planarization film with a portion of the planarizing film between reflective electrodes being removed in a transmissive region.
15. An electronic system including a semi-transmissive display apparatus that comprises:
a plurality of signal lines and a plurality of scan lines formed on a first substrate;

a plurality of pixels arranged in rows and columns at intersections of the plurality of signal lines and the plurality of scan lines;

a respective reflective electrode arranged in each of the plurality of pixels;

a transparent electrode formed on a second substrate faced to the first substrate;

and a liquid crystal layer between the reflective electrode and the transparent electrode;

wherein:

the reflective electrode includes openings, each of the pixels has a memory;

the reflective electrode in each of the pixels is divided into a plurality of sub-electrodes that are weighted in terms of area, and the display apparatus is configured to perform an area-based grayscale operation to express gray scales based on a combination of the areas of the sub-electrodes, wherein the reflective electrodes are formed on a planarization film with a portion of the planarizing film between reflective electrodes being removed in a transmissive region.

\* \* \* \* \*